(12) United States Patent
Fujiwara et al.

(10) Patent No.: US 12,107,487 B2
(45) Date of Patent: Oct. 1, 2024

(54) POWER CONVERSION DEVICE

(71) Applicant: Mitsubishi Electric Corporation, Tokyo (JP)

(72) Inventors: Kenji Fujiwara, Tokyo (JP); Tetsuya Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 131 days.

(21) Appl. No.: 18/011,850

(22) PCT Filed: Aug. 4, 2020

(86) PCT No.: PCT/JP2020/029771
§ 371 (c)(1),
(2) Date: Dec. 21, 2022

(87) PCT Pub. No.: WO2022/029869
PCT Pub. Date: Feb. 10, 2022

(65) Prior Publication Data
US 2023/0261563 A1    Aug. 17, 2023

(51) Int. Cl.
*H02M 7/5387* (2007.01)
*H02M 1/32* (2007.01)
*H02M 7/49* (2007.01)

(52) U.S. Cl.
CPC ............. *H02M 1/325* (2021.05); *H02M 7/49* (2013.01); *H02M 7/53871* (2013.01); *H02M 7/53873* (2013.01)

(58) Field of Classification Search
CPC ........ H02M 1/325; H02M 7/487; H02M 7/49; H02M 7/53871; H02M 7/53873
See application file for complete search history.

(56) References Cited

U.S. PATENT DOCUMENTS

2007/0147098 A1*  6/2007  Mori ................. H02J 3/1857
                                                          363/71
2011/0089765 A1    4/2011  Iwata et al.
                              (Continued)

FOREIGN PATENT DOCUMENTS

EP     3993250 A1    5/2022
JP     5-49286 A     2/1993
                (Continued)

OTHER PUBLICATIONS

Extended European search report issued on Jul. 31, 2023, in corresponding European patent Application No. 20947835.3, 8 pages.

(Continued)

*Primary Examiner* — Gary A Nash
(74) *Attorney, Agent, or Firm* — XSENSUS LLP

(57) ABSTRACT

Provided is a gradationally controlled inverter formed by series-connection between: a main inverter circuitry which has main inverter arms for outputting AC voltages for respective phases, and to which a voltage of a DC source is applied through a DC busbar; and a sub-inverter circuitry having three single-phase sub-inverters. Each of short-circuit switches is connected between an input terminal and an output terminal of a corresponding one of the sub-inverters. At the time of a failure of the sub-inverter, a bypass for current is formed for only the failure phase by causing short-circuiting at the short-circuit switch connected to the sub-inverter, and only the main inverter arm for the failure phase is operated as a three-level inverter.

20 Claims, 18 Drawing Sheets

(56) References Cited

U.S. PATENT DOCUMENTS

| | | | |
|---|---|---|---|
| 2011/0211381 A1* | 9/2011 | Iwata | H02M 7/4835 |
| | | | 363/132 |
| 2012/0033470 A1 | 2/2012 | Muneshima et al. | |
| 2016/0308478 A1* | 10/2016 | Sugiura | B62D 5/0487 |
| 2017/0244314 A1 | 8/2017 | Lee | |
| 2022/0149751 A1 | 5/2022 | Kojima | |
| 2022/0255457 A1 | 8/2022 | Kojima et al. | |

FOREIGN PATENT DOCUMENTS

| | | | | |
|---|---|---|---|---|
| JP | 11-122943 A | 4/1999 | | |
| JP | 2000-245168 A | 9/2000 | | |
| JP | 2015-47024 A | 3/2015 | | |
| JP | 2017-070064 A | 4/2017 | | |
| JP | 2017-147926 A | 8/2017 | | |
| JP | 6682049 B1 | 4/2020 | | |
| WO | 2009/116273 A1 | 9/2009 | | |
| WO | 2010/058536 A1 | 5/2010 | | |
| WO | 2010/119929 A1 | 10/2010 | | |
| WO | WO-2011093269 A1 * | 8/2011 | ............ | H02M 7/49 |
| WO | 2020/235101 A1 | 11/2020 | | |
| WO | 2020/261384 A1 | 12/2020 | | |

OTHER PUBLICATIONS

International Search Report and Written Opinion mailed on Sep. 24, 2020, received for PCT Application PCT/JP2020/029771, filed on Aug. 4, 2020, 8 pages including English Translation.

* cited by examiner

POWER CONVERSION DEVICE

CROSS-REFERENCE TO RELATED APPLICATION

The present application is based on PCT filing PCT/JP2020/029771, filed Aug. 4, 2020, the entire contents of which are incorporated herein by reference.

TECHNICAL FIELD

The present disclosure relates to a power conversion device.

BACKGROUND ART

In recent years, electrification systems such as electric automobiles or motor-driving from engines in ships and the like have been progressively spread. Furthermore, regarding aircrafts as well, research for electrification has been progressing in various countries throughout the world in view of the trend of reducing $CO_2$.

Power conversion devices having high efficiencies, low weights, and small sizes have been required for devices to be mounted in aircrafts in order to improve fuel efficiency. For the power conversion devices, an inverter for converting DC power supplied through a DC wire into AC power is necessary for driving an AC motor.

As a conventional technology for increasing the efficiency of the inverter and downsizing the inverter, a multilevel inverter of a series multiplex type has been proposed as in Patent Document 1. In the multilevel inverter of the series multiplex type, a main inverter with high voltage and low frequency, and a sub-inverter with low voltage and high frequency, are connected in series to each other. The multilevel inverter as a power conversion device outputs the sum of output voltages from the respective inverters. Hereinafter, this type of inverter is referred to as a gradationally controlled inverter.

CITATION LIST

Patent Document

Patent Document 1: WO2010/058536

SUMMARY OF THE INVENTION

Problems to be Solved by the Invention

A device mounted to an aircraft is required to have very high reliability and needs to have redundancy that enables operation to continue even if a part of the device fails. Therefore, the gradationally controlled inverter also needs to be continuously operated even if any of the plurality of inverters composing the gradationally controlled inverter fails.

The present disclosure has been made to solve the above problem, and an object of the present disclosure is to provide a power conversion device that can be continuously operated with a same output even if any of sub-inverters composing a gradationally controlled inverter fails.

Solution to the Problems

A power conversion device according to the present disclosure includes: a main inverter unit which has three main inverter arms for outputting respective voltages for a U phase, a V phase, and a W phase, and to which a voltage of a DC source is applied through a DC busbar; a sub-inverter unit having three single-phase sub-inverters, the sub-inverters being individually connected in series to outputs of the respective main inverter arms, each sub-inverter being individually provided with a short-circuit switch which causes short-circuiting between an input terminal and an output terminal of the sub-inverter; and a control device which controls the main inverter unit, the sub-inverter unit, and the short-circuit switch, wherein through control by the control device,
  in a normal state where none of the sub-inverters has failed, operations as gradationally controlled inverters are performed, each gradationally controlled inverter being configured to output a voltage resulting from adding up an output voltage from the main inverter arm for the corresponding phase and an output voltage from the sub-inverter for the phase, and meanwhile,
  in a state where any of the sub-inverters has failed,
    the short-circuit switch for the phase corresponding to the sub-inverter having failed is closed,
    the corresponding main inverter arm is operated as a three-level inverter, and,
    for the phases corresponding to the sub-inverters not having failed, operations as gradationally controlled inverters are performed in a same manner as in the normal state, each gradationally controlled inverter being configured to output a voltage resulting from adding up an output voltage from the main inverter arm for the corresponding phase and an output voltage from the sub-inverter for the phase.

Effect of the Invention

The power conversion device according to the present disclosure can be continuously operated with a same output even if any of sub-inverters composing a gradationally controlled inverter fails. In addition, overmodulation is inhibited, and current distortion is suppressed, whereby a zero-phase voltage for addition of subtraction can be minimized, and noise can be reduced. Further, a busbar voltage is equal to that in a steady state, and this leads to enhancement in terms of cost and size in the case of designing for adaptation to overvoltage.

DESCRIPTION OF EMBODIMENTS

Embodiment 1

Figure 1:
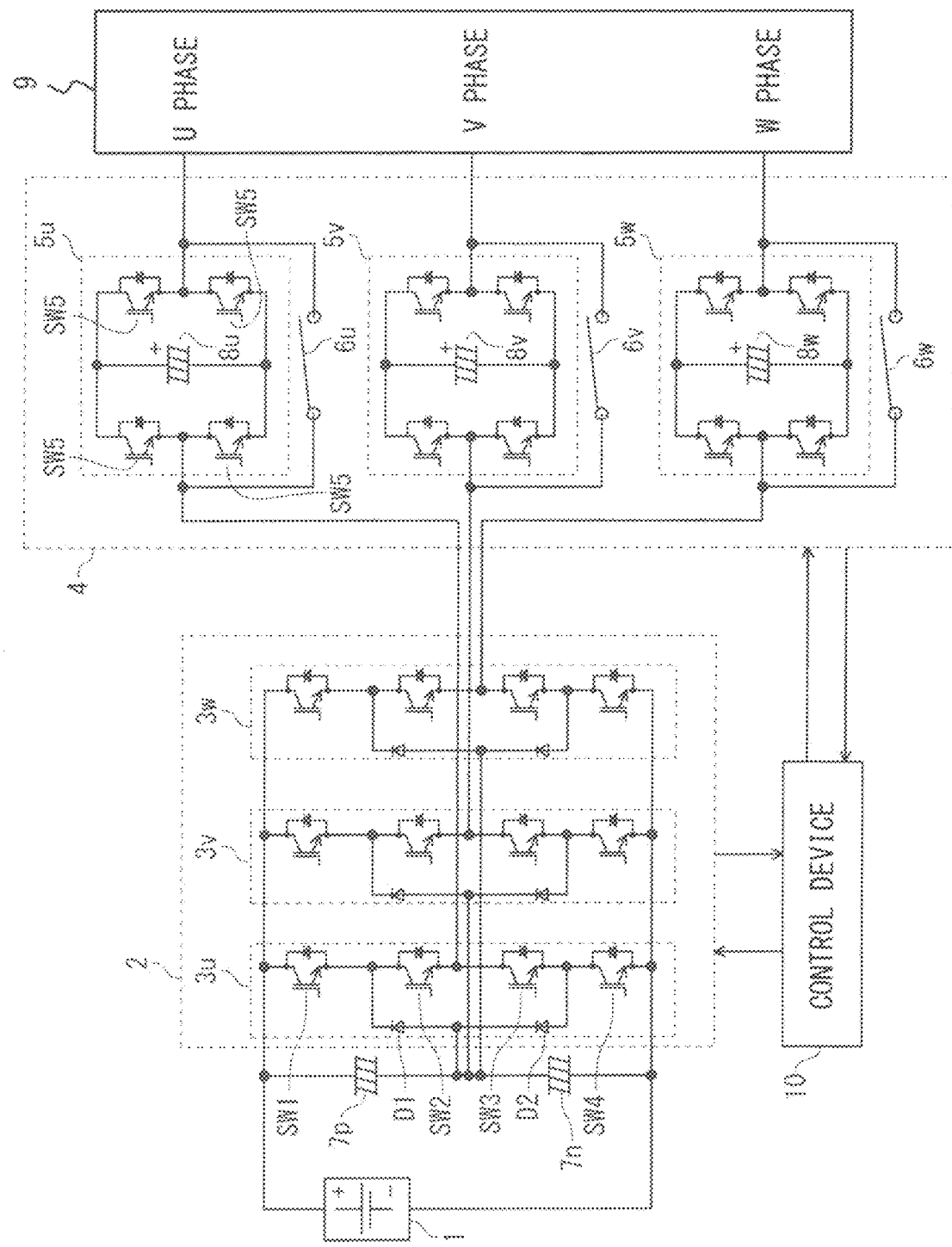
FIG. 1 is a circuit configuration diagram of a power conversion device according to embodiment 1.

FIG. 1 is a circuit configuration diagram of a power conversion device according to embodiment 1.

The power conversion device according to embodiment 1 includes a DC source 1 such as a battery and converts DC from the DC source 1 into AC necessary for driving a load 9 such as a motor. The power conversion device includes: a main inverter unit 2 with high voltage and low frequency; a sub-inverter unit 4 with low voltage and high frequency; and a control device 10 which controls operations of the main inverter unit 2 and the sub-inverter unit 4.

The power conversion device is configured as a gradationally controlled inverter in which: the main inverter unit 2 and the sub-inverter unit 4 are connected in series to each other; and a sum of output voltages from the main inverter unit 2 and the sub-inverter unit 4 is outputted. It is noted that the DC source 1 may not only be a DC source that supplies DC through a DC wire, but may also be a discrete DC power supply system or another battery system such as a solar cell.

The main inverter unit 2 is a three-phase three-level inverter and is composed of a U phase main inverter arm $3u$, a V-phase main inverter arm $3v$, and a W-phase main inverter arm $3w$. It is noted that the main inverter arms for the respective phases will be denoted by a reference character $3x$ when they are collectively referred to without distinguishing the main inverter arms $3u$, $3v$, and $3w$.

Each output-phase main inverter arm $3x$ is composed of: four switching elements SW1 to SW4 which are each a semiconductor element having switching ability such as an insulated gate bipolar transistor (IGBT) or a metal-oxide-silicon field effect transistor (MOSFET); and two diodes D1 and D2 each having rectification ability. It is noted that an IGBT, an MOSFET, or the like can also be used instead of each diode. Alternatively, the main inverter unit 2 is not limited to a three-phase inverter such as one in embodiment 1 and may be an inverter having another output level number.

Meanwhile, the sub inverter unit 4 includes a U-phase sub-inverter $5u$, a V-phase sub-inverter $5v$, and a W-phase sub-inverter $5w$. The U-phase sub-inverter $5u$, the V-phase sub-inverter $5v$, and the W-phase sub-inverter $5w$ are individually connected to output terminals of the U-phase main inverter arm $3u$, the V-phase main inverter arm $3v$, and the W-phase main inverter arm $3w$, respectively. It is noted that the sub-inverters for the respective phases will be denoted by a reference character $5x$ when they are collectively referred to without distinguishing the sub-inverters $5u$, $5v$, and $5w$.

In this case, each of the sub-inverters $5u$, $5v$, and $5w$ for the respective phases is a single-phase full-bridge inverter and is formed by: including, per bridge, two switching elements SW5 which are each a semiconductor element such as an IGBT or an MOSFET; and connecting a corresponding one of capacitors $8u$, $8v$, and $8w$ between the bridges.

A DC busbar voltage VDCM applied to the main inverter unit 2 is a voltage of the DC source 1. Since the main inverter unit 2 is a three-level inverter, the DC busbar voltage VDCM is divided, at a neutral point, into DC busbar voltages for two capacitors $7p$ and $7n$ connected in series. Out of the DC busbar voltages, a DC busbar voltage for the capacitor $7p$ on a high-potential side is referred to as a half busbar voltage VDCMP, and a DC busbar voltage for the capacitor $7n$ on a low-potential side is referred to as a half busbar voltage VDCMN. It is noted that a busbar voltage VDCS between the bridges of each of the sub-inverters $5x$ for the respective phases is lower than the voltage, of the DC source 1, which is the DC busbar voltage VDCM of the main inverter unit 2.

Further, the present embodiment 1 is characterized in that each of a U-phase short-circuit switch $6u$, a V-phase short-circuit switch $6v$, and a W-phase short-circuit switch $6w$ is individually provided between an input terminal and an output terminal of a corresponding one of the U-phase sub-inverter $5u$, the V-phase sub-inverter $5v$, and the W-phase sub-inverter $5w$. It is noted that the short-circuit switches for the respective phases will be denoted by a reference character $6x$ when they are collectively referred to without distinguishing the short-circuit switches $6u$, $6v$, and $6w$.

If any of the sub-inverters $5x$ ($5u$, $5v$, and $5w$) has failed, the failure is detected. Upon the detection, the short-circuit switch $6x$ for the sub-inverter $5x$ having failed is turned on. Consequently, current is caused to flow so as to bypass the sub-inverter $5x$. It is noted that failure detection is performed through abnormality detection by the control device 10, such as: detection of short-circuit current in any of the sub-inverters $5x$ for the respective phases; or detection of deficiency in output voltage as phase voltage.

Figure 2A:
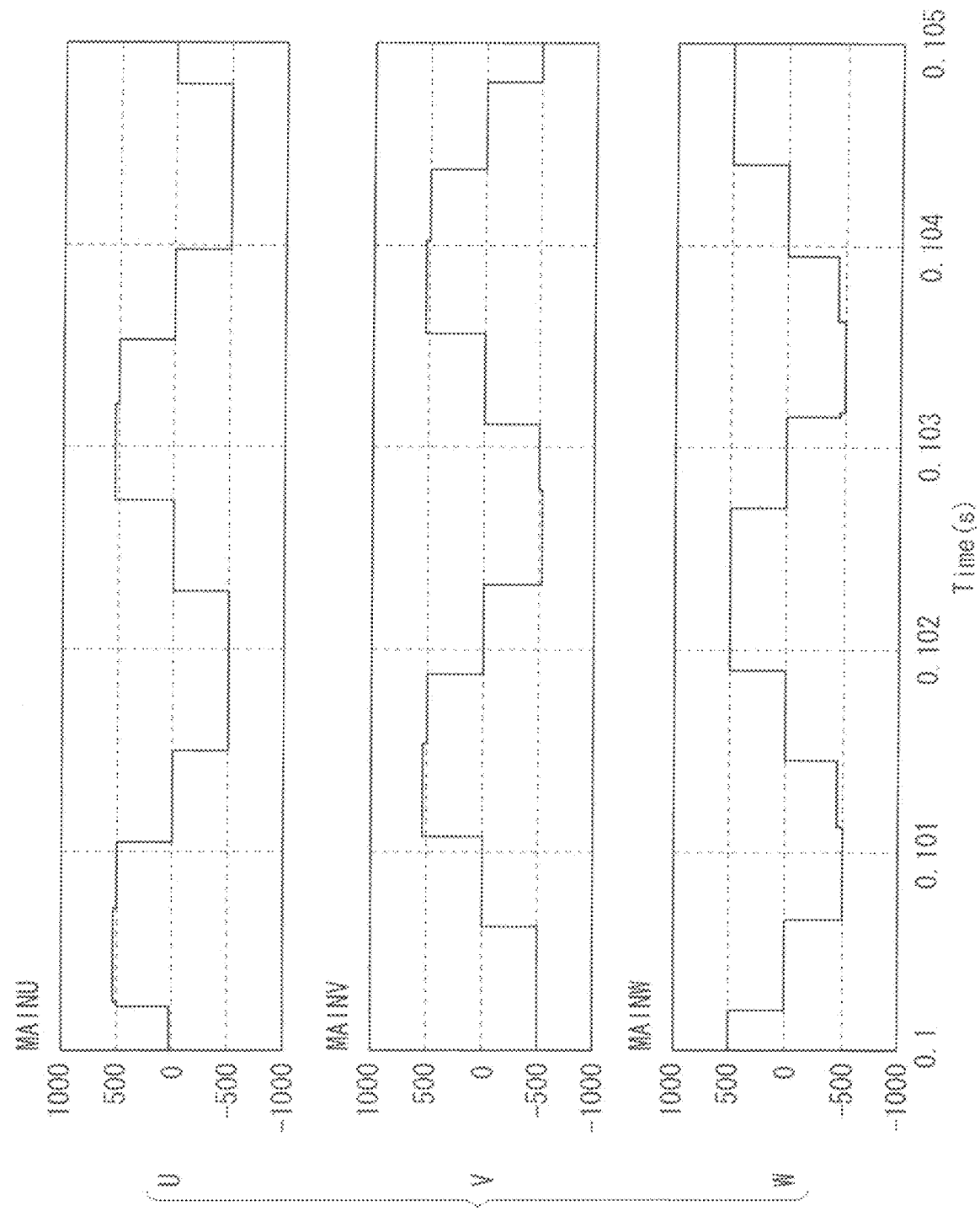
FIG. 2A is a waveform diagram showing output voltage waveforms for respective phases, in the power conversion device according to embodiment 1.
Figure 2B:
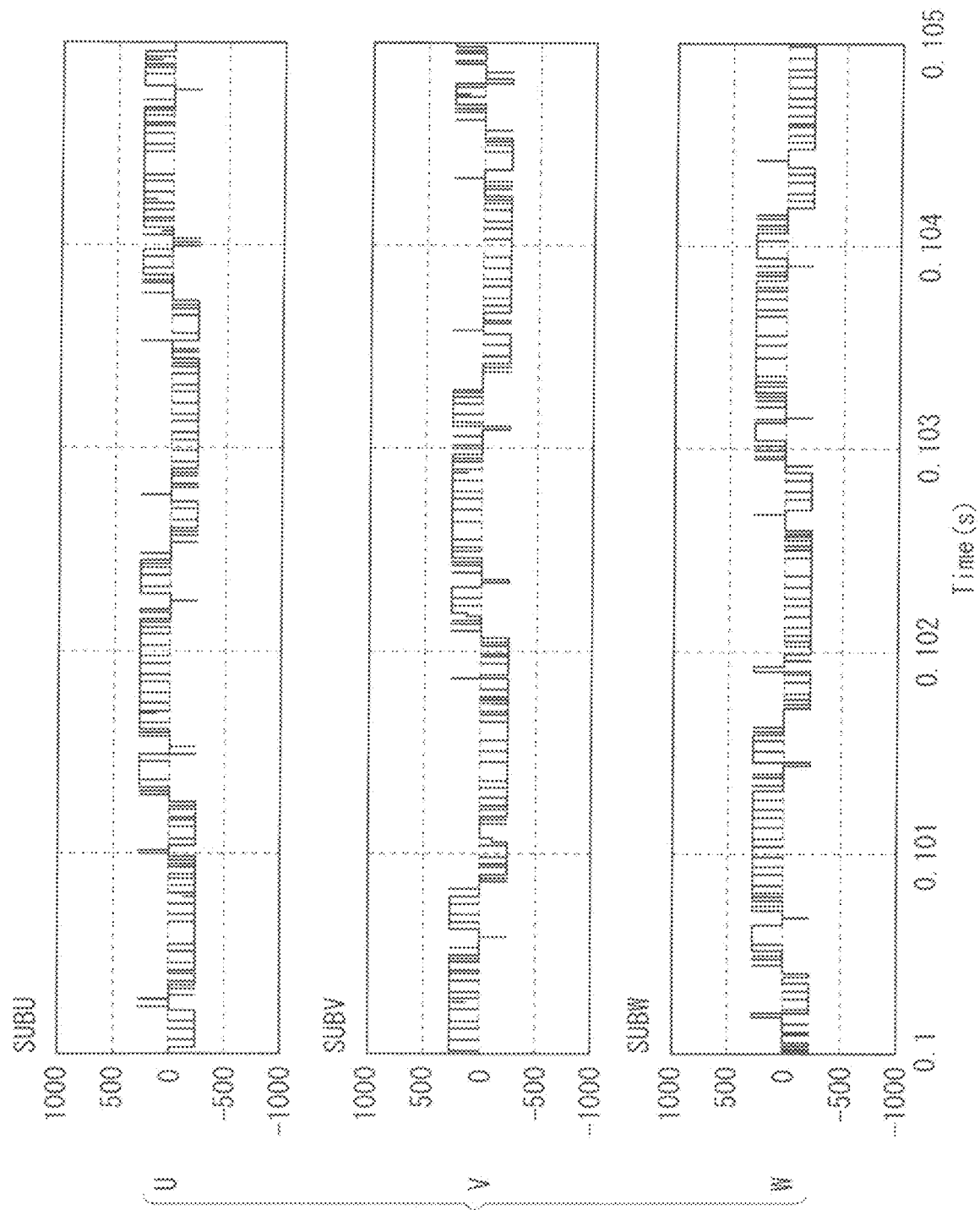
FIG. 2B is a waveform diagram showing output voltage waveforms for the respective phases, in the power conversion device according to embodiment 1.
Figure 2C:
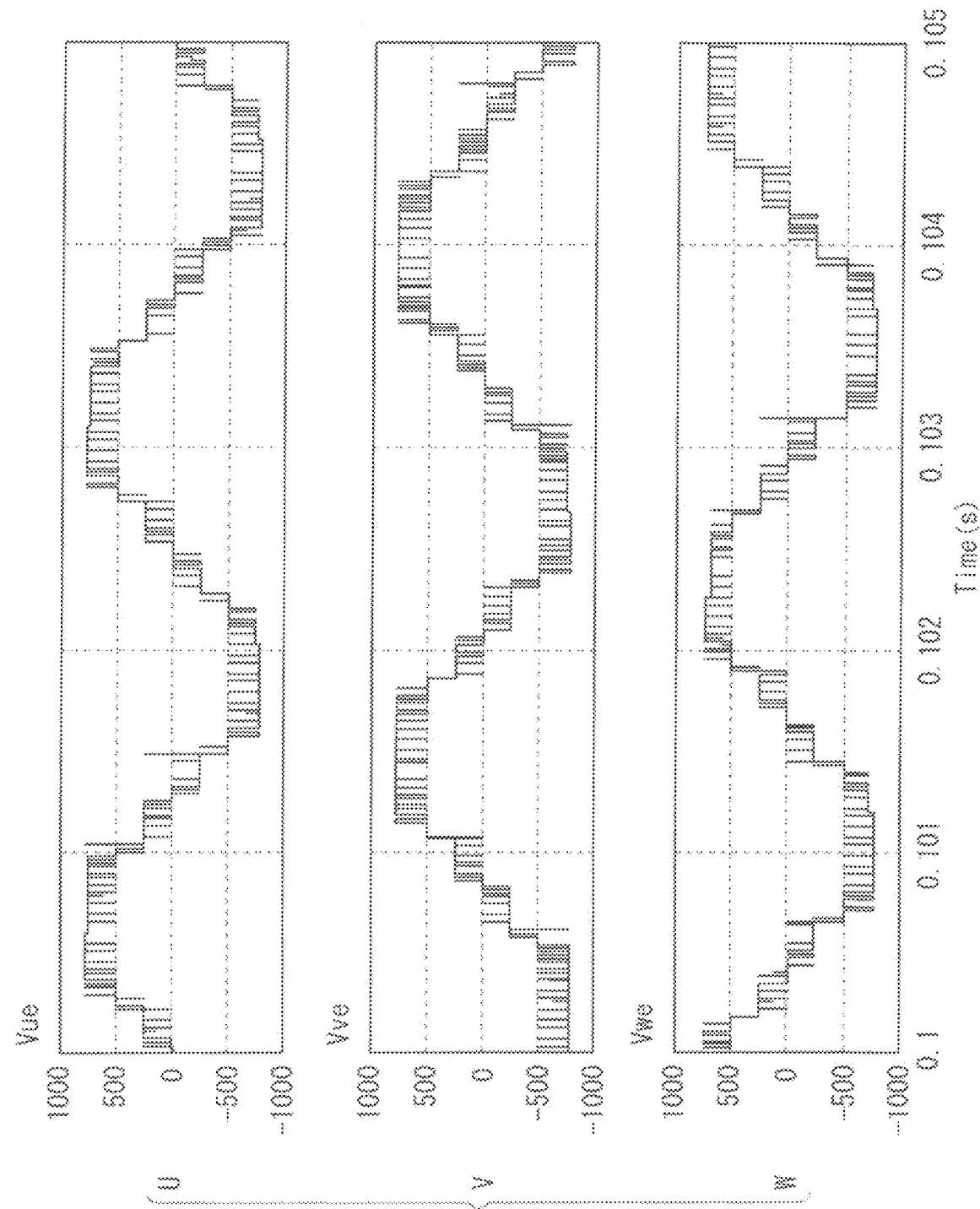
FIG. 2C is a waveform diagram showing output voltage waveforms for the respective phases, in the power conversion device according to embodiment 1.

FIG. 2A to FIG. 2C are waveform diagrams showing: voltages from the main inverter unit 2 in the case where none of the sub-inverters $5x$ for the respective phases has failed, i.e., all of the sub inverters 5*x* are normal, and all of the short-circuit switches 6*x* for the respective phases are turned off (FIG. 2A); voltages from the sub-inverter unit 4 in the said case (FIG. 2B); and output phase voltages, from the power conversion device, each of which is the sum of output voltages from the main inverter unit 2 and the sub-inverter unit 4 in the said case (FIG. 2C).

The waveforms in FIG. 2A are output voltage waveforms, for the respective phases, from the main inverter unit 2. In FIG. 2A, MAINU indicates a voltage waveform from the U-phase main inverter arm 3*u*, MAINV indicates a voltage waveform from the V-phase main inverter arm 3*v*, and MAINW indicates a voltage waveform from the W-phase main inverter arm 3*w*. The switching frequency of each switching element in the main inverter unit 2 is equivalent to the frequency of the power supply, and, in the present embodiment 1, one time of positive-side switching and one time of negative-side switching are performed per cycle.

The waveforms in FIG. 2B are output voltage waveforms from the sub-inverter unit 4. In FIG. 28, SUBU indicates a voltage waveform from the U-phase sub-inverter 5*u*, SUBV indicates a voltage waveform from the V-phase sub-inverter 5*v*, and SUBW indicates a voltage waveform from the W-phase sub-inverter 5*w*. In the sub-inverter unit 4 with low busbar voltages, switching is performed at a higher frequency than in the main inverter unit 2. In addition, the sub-inverter unit 4 outputs a difference between a target voltage of the power conversion device and an output voltage from the main inverter unit 2.

The waveforms in FIG. 2C are output voltage waveforms, from the power conversion device, each of which is the sum of output voltages from the main inverter unit 2 and the sub-inverter unit 4. In FIG. 2C, Vue indicates an output voltage waveform for the U phase, Vve indicates an output voltage waveform for the V phase, and Vwe indicates an output voltage waveform for the W phase.

As shown in FIG. 2C, the power conversion device as a gradationally controlled inverter can output multilevel waveforms similar to sine waves. It is noted that seven-level output voltage waveforms are generated here.

In this manner, the power conversion device according to the present embodiment 1 is configured as a gradationally controlled inverter as a whole, and the only switching operations performed at a high frequency are ones in the sub-inverter unit 4 with low busbar voltages, whereby switching loss and noise decrease. Therefore, a cooler and a noise filter can be downsized, and thus the gradationally controlled inverter can be formed as a power conversion device having a low weight.

Next, an operation performed in the case where the U-phase sub-inverter 5*u* in the sub-inverter unit 4 has failed will be described as an example.

Figure 3:
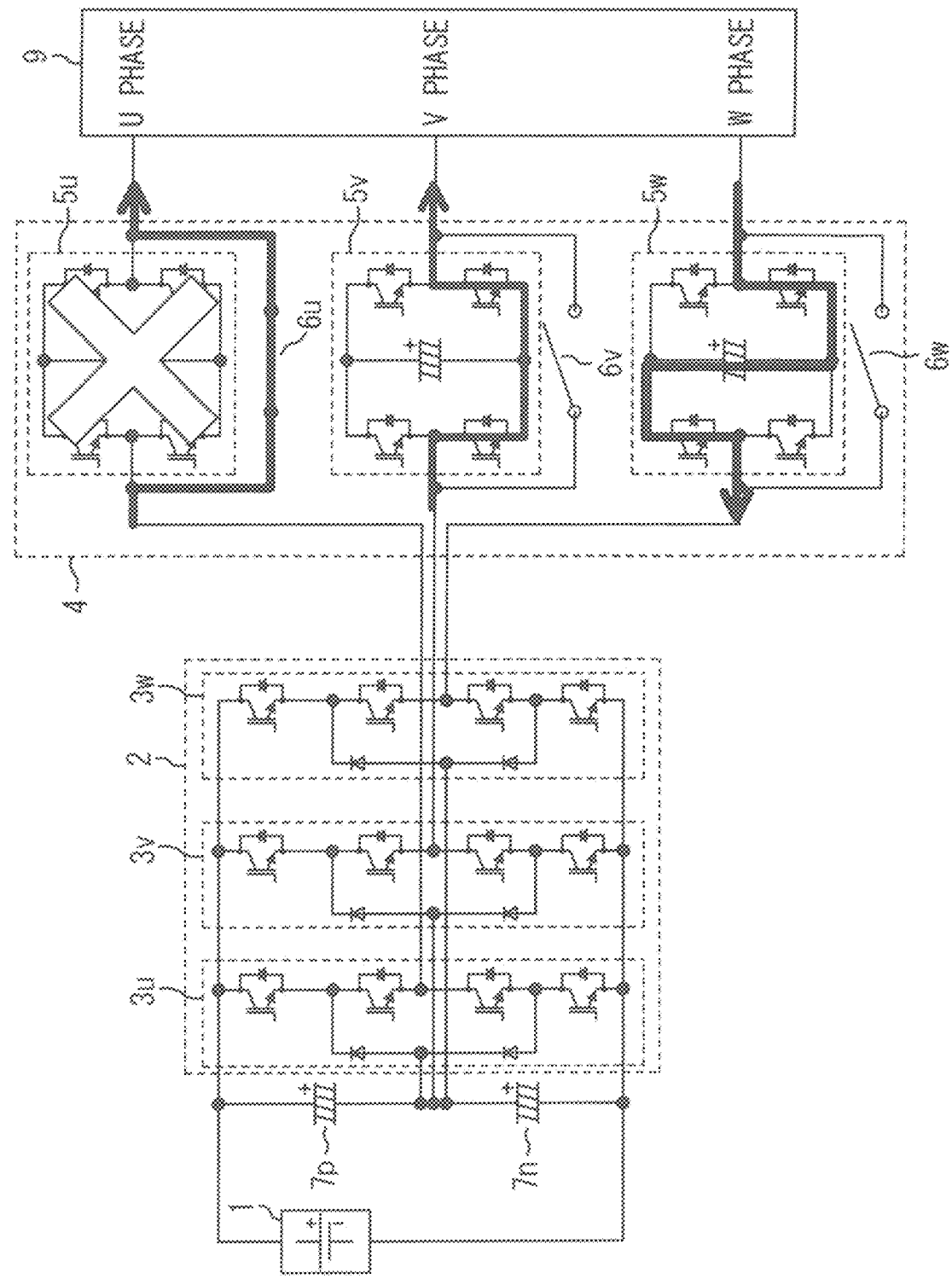
FIG. 3 is a diagram for explaining operation states of short-circuit switches and flows of output currents, in the case where a U-phase sub-inverter in embodiment 1 has failed.

FIG. 3 illustrates, as an example, an operation state taken if the U-phase sub inverter 5*u* has failed.

When the U-phase sub-inverter 5*u* fails, the U-phase short-circuit switch 6*u* is turned on, and thus the U-phase sub-inverter 5*u* is bypassed. Meanwhile, the V-phase short-circuit switch 5*v* for the V-phase sub-inverter 5*v* which is normal, and the W-phase short-circuit switch 5*w* for the W-phase sub-inverter 5*w* which is normal, are opened.

At this time, the U-phase main inverter arm 3*u* corresponding to the U-phase sub-inverter 5*u* having failed continues to output a low distortion waveform in order to mitigate a load. That is, since the U-phase sub inverter 5*u* is bypassed, the U-phase main inverter arm 3*u* is operated as a three-level inverter that performs switching at a higher frequency than the main inverter arms 3*v* and 3*w* for the other V and W phases.

Meanwhile, the sub-inverters 5*v* and 5*w* for the V phase and the W phase are normal, and thus the respective main inverter arms 3*v* and 3*w* for the V phase and the W phase corresponding thereto continue to be operated as gradationally controlled inverters. That is, the main inverter arms 3*v* and 3*w* for the respective V and W phases are operated as three-level inverters having lower frequencies than the main inverter arm 3*u* for the U phase, and the sub-inverters 5*v* and 5*w* for the respective V and W phases have busbar voltages lower than the DC busbar voltage VDCM and perform switching at higher frequencies than the main inverter arms 3*v* and 3*w* for the respective V and W phases.

Hereinafter, in this power conversion device, a phase corresponding to a state where the corresponding sub-inverter has failed and the corresponding short-circuit switch is closed is referred to as a failure phase, and a phase corresponding to a state where no sub-inverter has failed and the corresponding short-circuit switch is opened is referred to as a normal phase, for convenience. Further, an operation mode in which a main inverter arm for a failure phase performs switching at a high frequency is referred to as an operation as a three-level inverter. Meanwhile, an operation mode in which a math inverter arm for a normal phase and a sub-inverter for the normal phase are operated together is referred to as an operation as a gradationally controlled inverter.

Figure 4:
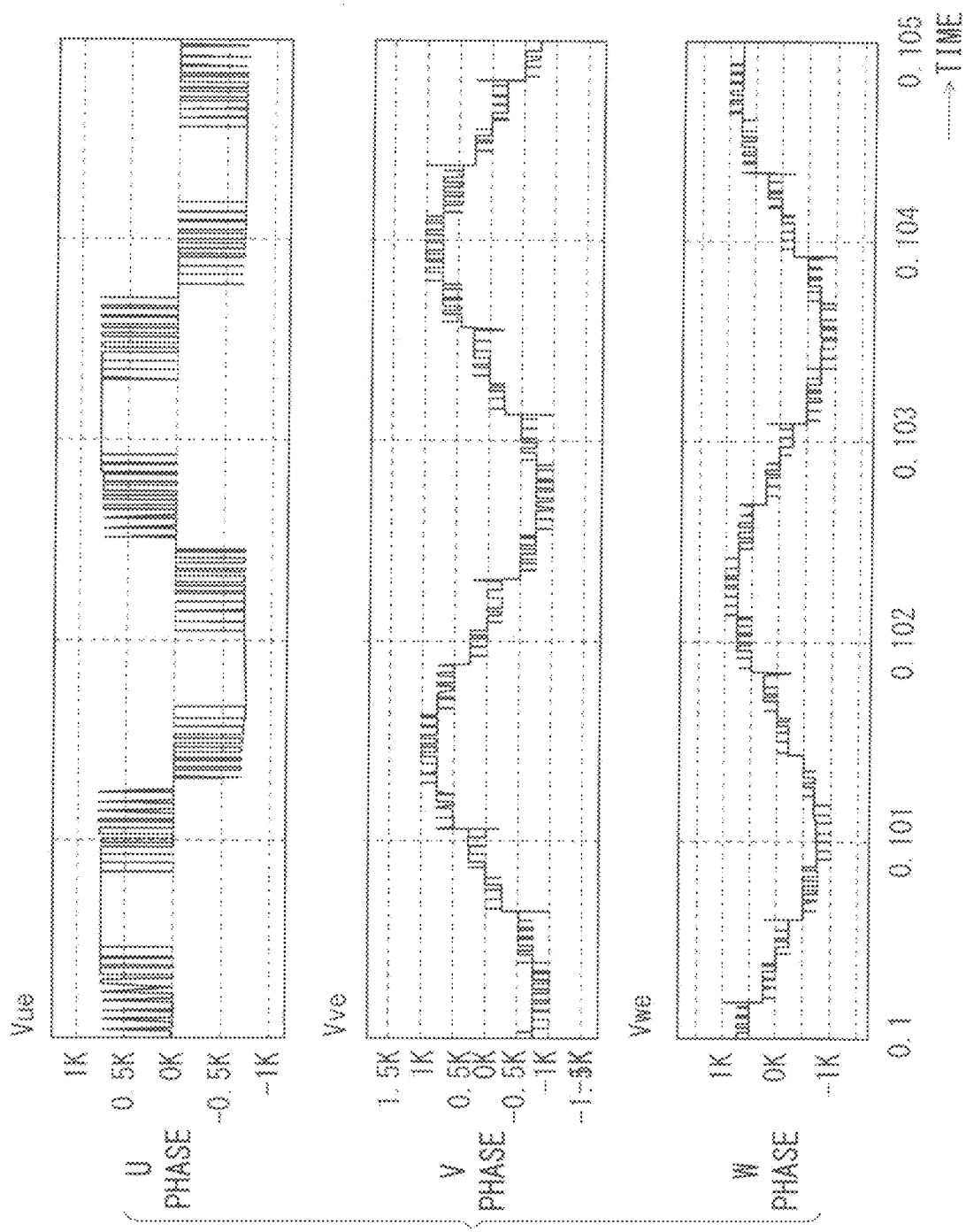
FIG. 4 is a waveform diagram showing output voltage waveforms for the respective phases in the power conversion device, in the case where the U-phase sub-inverter in embodiment 1 has failed.

FIG. 4 is a waveform diagram showing output voltage waveforms for the respective phases in the power conversion device, in the case where the U-phase sub-inverter 5*u* has failed.

The waveform in an upper row of FIG. 4 is of an output voltage Vue for the U phase corresponding to the sub-inverter 5*u* having failed, and this output waveform is formed as a waveform, of a three-level voltage, that has a smaller level number than the waveform of a seven-level voltage (shown in FIG. 2C) from a gradationally controlled inverter. The waveform in an intermediate row of FIG. 4 is of an output voltage for the V phase, the waveform in a lower row of FIG. 4 is of an output voltage for the W phase, and operations as gradationally controlled inverters which output waveforms with the same level numbers (here, seven levels) as those in FIG. 2C, continue.

The half busbar voltage VDCMP or VDCMN of the main inverter unit 2 is higher than each busbar voltage VDCS in the sub-inverter unit 4. Thus, if the main inverter arm 3*u* corresponding to the sub-inverter 5*u* having failed is operated as a three-level inverter, generated heat increases. However, the amount of increase in generated heat can be limited to only the amount of generated heat from the main inverter arm (in this example, 3*u*) corresponding to the failure phase since: for only the phase in which the sub-inverter 5*u* has failed, the main inverter arm 3*u* is operated as a three-level inverter; and the main inverter arms 3*v* and 3*w* for the remaining normal V and W phases continue to be operated as gradationally controlled inverters.

Consequently, a cooler formed in consideration of redundancy can be downsized.

It is noted that, although a case where a failure has occurred in one phase has been described in the present embodiment 1, the present disclosure is applicable in the same manner also to a case where sub-inverters for two phases have failed. In addition, without using any short-circuit switch 6*x*, a bypass can also be formed with an output from a sub-inverter being set to zero by using a switching mode in which a surviving switch element having experienced no failure is turned on only on a low side or high side.

As described above, the present embodiment 1 is such that: for only a failure phase in which the corresponding sub-inverter has failed, the corresponding main inverter arm is operated as a three-level inverter; and the main inverter arms for the remaining normal phases continue to be operated as gradationally controlled inverters. Consequently, a continuous operation can be performed with a same output even if any of the sub-inverters fails. Moreover, since the amount of increase in generated heat can be limited to only the amount of generated heat from the main inverter arm for the failure phase, redundancy can be ensured.

Embodiment 2

The entire configuration of a power conversion device according to the present embodiment 2 is the same as that in FIG. 1, and thus detailed descriptions thereof will be omitted here.

In the case where both the main inverter unit 2 and the sub-inverter unit 4 are normal and operated as gradationally controlled inverters, if voltage drops having occurred in circuits are ignored, a maximum voltage capable of being outputted is the sum of the half busbar voltage VDCMP or VDCMN of the main inverter unit 2 and the busbar voltage VDCS of the sub-inverter unit 4.

Meanwhile, in the case where any of the sub-inverters 5x is bypassed owing to a failure thereof and the corresponding main inverter arm 3x is operated as a three-level inverter, if voltage drops having occurred in circuits are ignored, the corresponding maximum voltage capable of being outputted is the half busbar voltage VDCMP or VDCMN of the main inverter unit 2. Therefore, if the main inverter arm 3x is operated as a three-level inverter, the maximum voltage becomes lower, by the busbar voltage VDCS of the sub-inverter 5x having failed, than that in the case of an operation as a gradationally controlled inverter, whereby unbalance in voltage occurs.

Considering this, the present embodiment 2 involves performing a process of compensating for, by means of a zero-phase voltage (hereinafter, this voltage is referred to as a zero-phase compensation voltage), unbalance in voltage that occurs if any of the main inverter arms 3x is operated as a three-level inverter, to reduce the unbalance in voltage as much as possible.

It is noted that a case where the failure phase is the U phase will be described here as an example. If calculation is performed in a manner that is the same among the phases, a name "X phase" is used for explanations, and the X phase represents any of the three phases U, V, and W.

Figure 5:
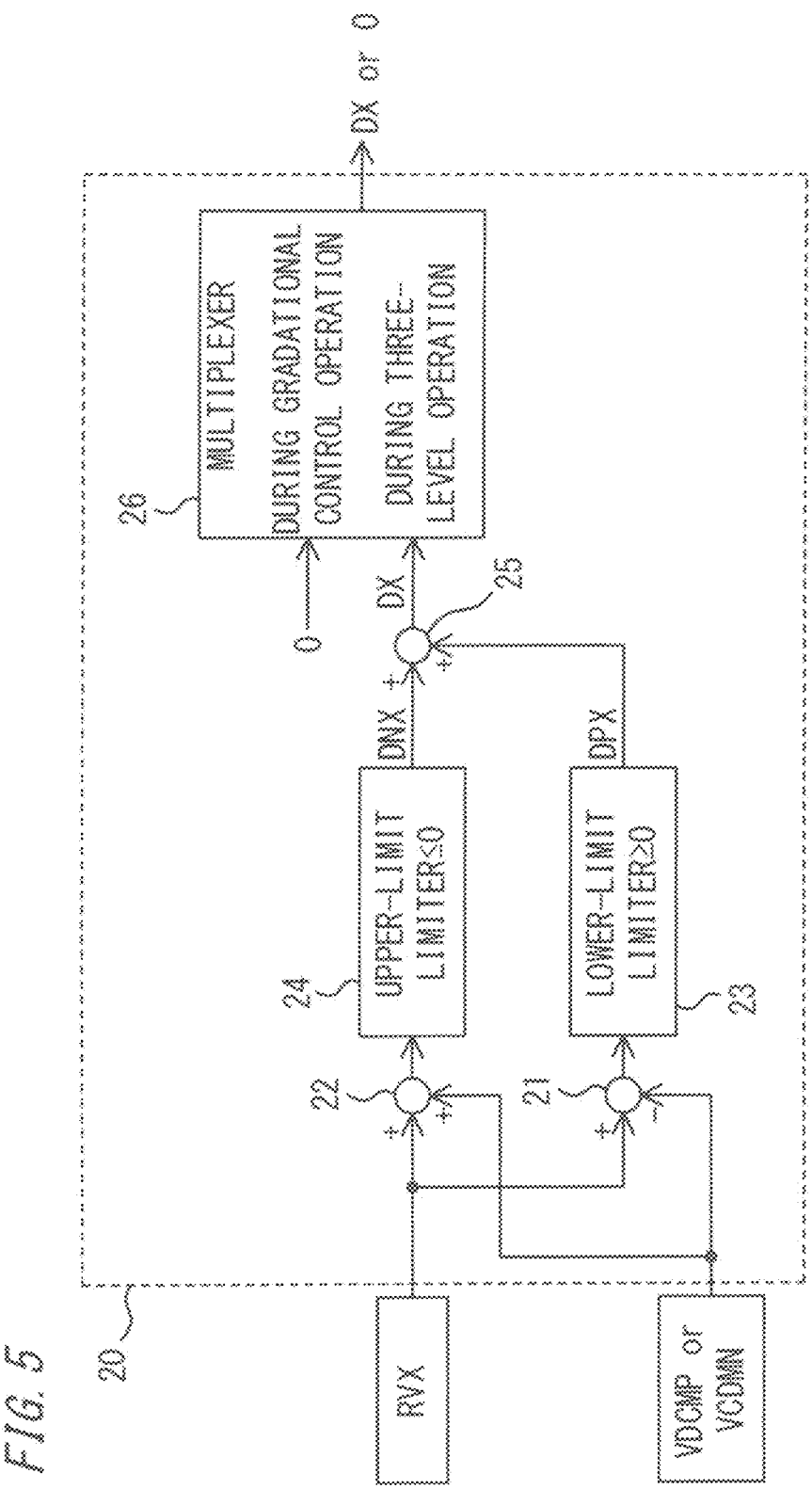
FIG. 5 is a function block diagram of a phase compensation voltage calculation unit in embodiment 2.

FIG. 5 is a function block diagram of a phase compensation voltage calculation unit which calculates each of phase compensation voltages for the respective phases, in the present embodiment 2. In FIG. 5, a phase compensation voltage calculation unit 20 is implemented by, for example, inputting a preset program via a volatile storage device to a processor included in the control device 10. The same applies also to a zero-phase compensation voltage calculation unit 30 shown in FIG. 6 described later and a final output voltage target value calculation unit 40 shown in FIG. 7 described later.

In FIG. 5, an output voltage target value RVX for the X phase is set to an output target voltage, for the power conversion device, that is determined according to load control. The half busbar voltage of the main inverter unit 2 is VDCMP or VDCMN. In the present embodiment 2, if the output voltage target value RVX for the X phase has a positive sign, VDCMP is used, and, if the output voltage target value RVX for the X phase has a negative sign, VDCMN is used. It is noted that the busbar voltage is not limited thereto and may be the average value of the half busbar voltage VDCMP or VDCMN.

In the phase compensation voltage calculation unit 20 in FIG. 5, if the output voltage target value RVX for the X phase has a positive sign, a subtractor 21 calculates a difference between the output voltage target value RVX and the half busbar voltage VDCMP. If the difference has a positive sign (that is, if the output voltage target value RVX is equal to or larger than the busbar voltage VDCMP), a lower-limit limiter 23 is activated, and the above difference DPX is outputted.

Likewise, if the output voltage target value RVX for the X phase has a negative sign, a subtractor 22 calculates a difference between the output voltage target value RVX and the half busbar voltage VDCMN. If the difference has a negative sign (that is, if the output voltage target value RVX is equal to or smaller than the half busbar voltage VDCMP), an upper-limit limiter 24 is activated, and the above difference DNX is outputted.

It is noted that the half busbar voltage VDCMN has a positive value only, and thus FIG. 5 expresses calculation of the aforementioned difference by means of addition.

A value DX (=DPX+DNX) resulting from adding up the above difference DPX and the above difference DNX by an adder 25 is an adjustment voltage DX for the X phase. However, the value DX (=DPX+DNX) is not necessary while an operation as a gradationally controlled inverter is being performed. Therefore, if the inverter for the X phase for which calculation has been performed is operated as a three-level inverter, a multiplexer 26 outputs, as the adjustment voltage DX for the X phase, the value resulting from addition by the adder 25. Meanwhile, if the inverter is operated as a gradationally controlled inverter, the multiplexer 26 selects and outputs zero as the adjustment voltage DX for the X phase. It is noted that, although the multiplexer 26 is used in FIG. 5 as the above selection means, a conditional or the like may be used as an output selection means in the case of creation with a program.

Figure 6:
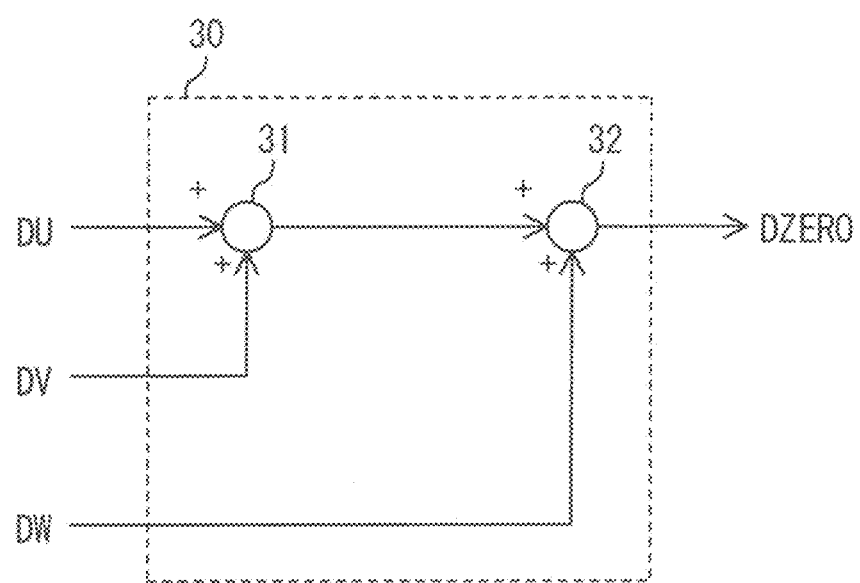
FIG. 6 is a function block diagram of a zero-phase compensation voltage calculation unit in embodiment 2.

FIG. 6 is a function block diagram of the zero-phase compensation voltage calculation unit in the present embodiment 2.

When the adjustment voltage DX for the X phase is obtained from the phase compensation voltage calculation unit 20, the zero-phase compensation voltage calculation unit 30 adds up, by means of adders 31 and 32, results of calculation for the respective phases which are a U-phase adjustment voltage DU, a V-phase adjustment voltage DV, and a W-phase adjustment voltage DW, and outputs the sum as a zero-phase compensation voltage DZERO for the power conversion device.

Figure 7:
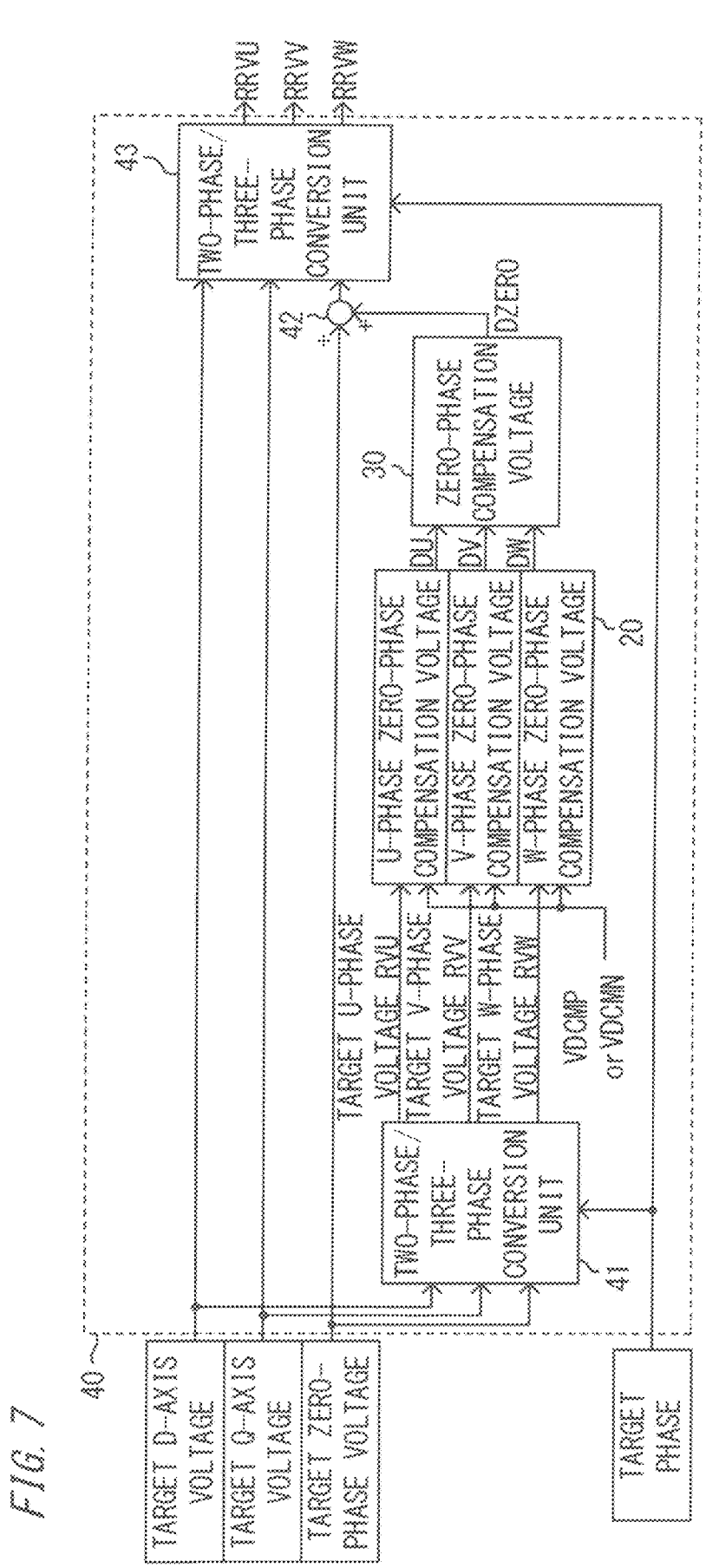
FIG. 7 is a function block diagram of a final output voltage target value calculation unit in embodiment 2.

FIG. 7 is a function block diagram of a final output voltage target value calculation unit which calculates final output voltage target values for the respective phases from output voltage target values with respect to the load, in the power conversion device according to the present embodiment 2.

In the final output voltage target value calculation unit 40, a two-phase/three-phase conversion unit 41 generates output voltage target values RVX (RVU, RVV, and RVW) from signals indicating a target D-axis voltage, a target Q-axis voltage, a target zero-phase voltage, and a target phase which are determined with respect to the power conversion device in order to control the load 9. Next, each of adjustment voltages DX (DU, DV, and DW) for the respective phases is calculated through the aforementioned process by the corresponding phase compensation voltage calculation unit 20 in FIG. 5. Subsequently, a zero-phase compensation voltage DZERO is calculated through the process by the zero-phase compensation voltage calculation unit 30 in FIG. 6. Then, an adder 42 adds the zero-phase compensation voltage DZERO to the target zero-phase voltage, and a two-phase/three-phase conversion unit 43 performs two-phase/three-phase conversion to calculate final output voltage target values RRVX (RRVU, RRVV, and RRVW) for the respective phases.

Thus, in a phase period during which, if a failure of any of the sub-inverters 5x causes the corresponding main inverter arm 3x to be operated as a three-level inverter, this X phase (here, the U phase) lacks voltage by the corresponding busbar voltage VDCS, the zero-phase compensation voltage DZERO is added to each of the output voltage target values RVX for the three phases so that final output voltage target values RRVX for the respective phases are outputted. Consequently, unbalance in voltage among the phases is reduced as much as possible.

Figure 8:
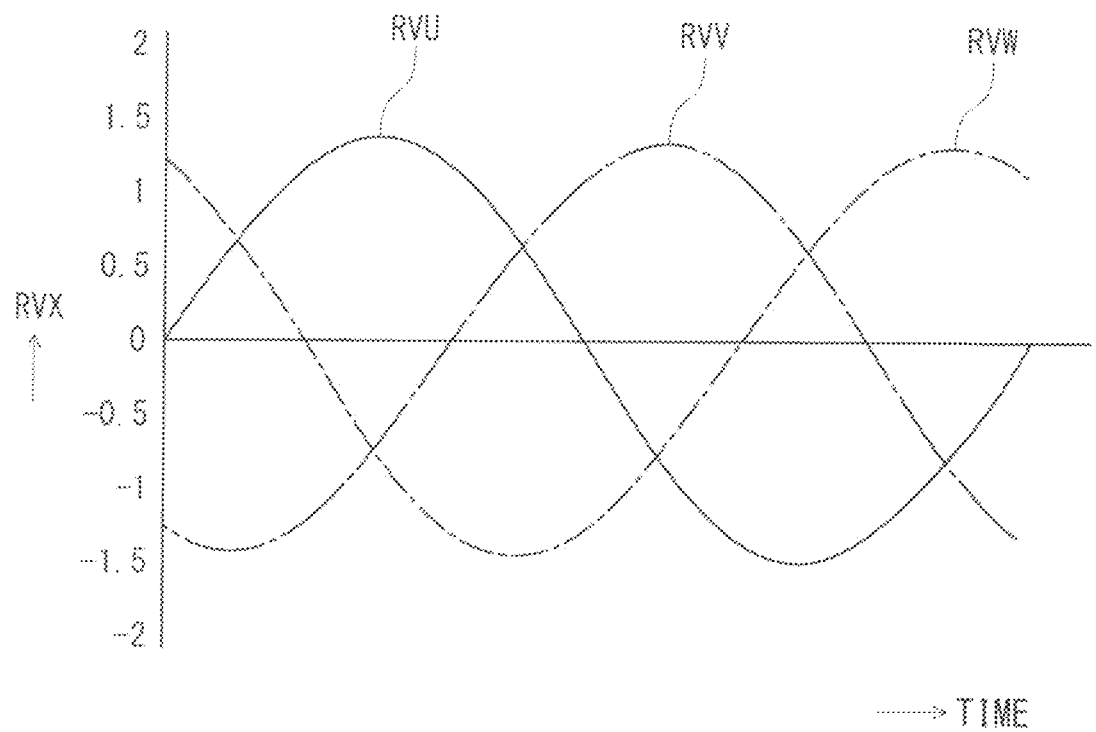
FIG. 8 is a waveform diagram showing output target voltage values for the respective phases with respect to a load, in embodiment 2.
Figure 9:
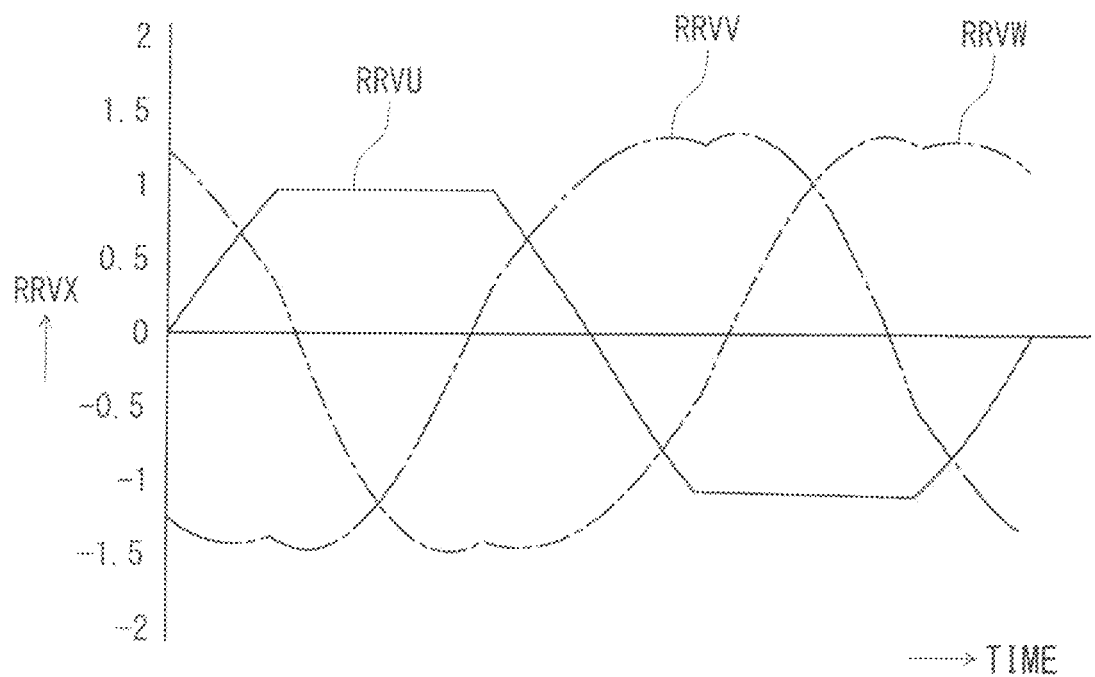
FIG. 9 is a waveform diagram showing final output voltage target values for the respective phases with respect to a power conversion device according to embodiment 2, the final output voltage target values resulting from zero-phase voltage compensation.

FIG. 8 is a waveform diagram of the output voltage target values RVX, for the respective phases, not having yet been subjected to zero-phase voltage compensation. FIG. 9 is a waveform diagram showing the final output voltage target values RRVX, with respect to the power conversion device, resulting from compensating the output voltage target values RVX by means of the zero-phase compensation voltage DZERO. It is noted that FIG. 8 and FIG. 9 each show a case where a condition is set such that a maximum instantaneous voltage is about 1.414 [p.u.] and the half busbar voltage VDCMP or VDCMN is 1.0 [p.u.].

It is seen from FIG. 9 that the U-phase sub-inverter 5u has failed, and only the final output voltage target value RRVU for the U phase is clamped at an absolute value of 1.0 [p.u.]. It is noted that, regarding an operation as a three-level inverter, complete two-phase modulation may be performed instead of PWM control, with an ON state being kept constantly. In this case as well, a threshold value within a range from the absolute value of 1.0 [p.u.] plus 0.1 [p.u.] to the absolute value of 1.0 [p.u.] minus 0.1 [p.u.] can be used.

It is noted that, although descriptions have been given in the present embodiment 2 on the premise that the failure phase is the U phase, the failure phase is not limited to the U phase, and the present disclosure is applicable also to the case where the failure phase is another phase or two failure phases are present.

As described above, in the present embodiment 2, if a failure of any of the sub inverters causes the corresponding main inverter arm to be operated as a three-level inverter, and the absolute value of the corresponding output voltage target value exceeds the busbar voltage, the zero-phase compensation voltage is added to each of the output voltage target values for the three phases in a phase period during which the DC busbar voltage is lower than the output voltage target value. Consequently, a line-to-line voltage equivalent to that in gradational control can be outputted. That is, the magnitude of output with respect to the load can be maintained. In addition, the zero-phase compensation voltage to be added can be limited to a compensation amount for only the failure phase, and thus leakage current can be reduced.

Embodiment 3

The entire configuration of a power conversion device according to the present embodiment 3 is the same as that in FIG. 1, and thus detailed descriptions thereof will be omitted here.

In the present embodiment 3, unbalance in voltage that occurs upon a failure of any of the sub-inverters is compensated for by means of a zero-phase voltage through a method different from that in embodiment 2. In this case, since there is an upper limit for a voltage capable of being compensated, a maximum value of the voltage capable of being outputted from a normal-phase gradationally controlled inverter is set as an upper limit. It is noted that a case where the failure phase is the U phase will be described here as an example.

The U-phase main inverter arm 3u corresponding to the failure phase is operated as a three-level inverter, and, if the absolute value of the output voltage target value RVU for the U phase is equal to or larger than the half busbar voltage VDCMP of the main inverter unit 2 or is equal to or smaller than the half busbar voltage VDCMN of the main inverter unit 2, a difference voltage Y therebetween is, as an adjustment voltage for zero-phase compensation, added to or subtracted from each of the output voltage target values RVU, RVV, and RVW for the U phase, the V phase, and the W phase.

For example, if the output voltage target value RVU for the U phase is larger than the half busbar voltage VDCMP, the final output voltage target value RRVU to be calculated again with respect to the power conversion device is expressed with the following (expression 1). In this case, since the difference voltage Y is subtracted also for the V phase and the W phase, the corresponding final output voltage target values RRVV and RRVW are expressed with (expression 2) and (expression 3).

RRVU=RVU−Y (expression 1)

RRVV=RVV−Y (expression 2)

RRVW=RVW−Y (expression 3)

Likewise, if the output voltage target value RVU of the U-phase voltage is smaller than a half busbar voltage having a negative value −VDCMN, the final output voltage target value RRVU to be calculated again with respect to the power conversion device is expressed with the following (expression 4). In this case, since the difference voltage Y is subtracted also for the V phase and the W phase, the corresponding final output voltage target values RRVV and RRVW are expressed with (expression 5) and (expression 6).

RRVU=RVU+Y (expression 4)

RRVV=RVV+Y (expression 5)

RRVW=RVW+Y (expression 6)

Figure 10:
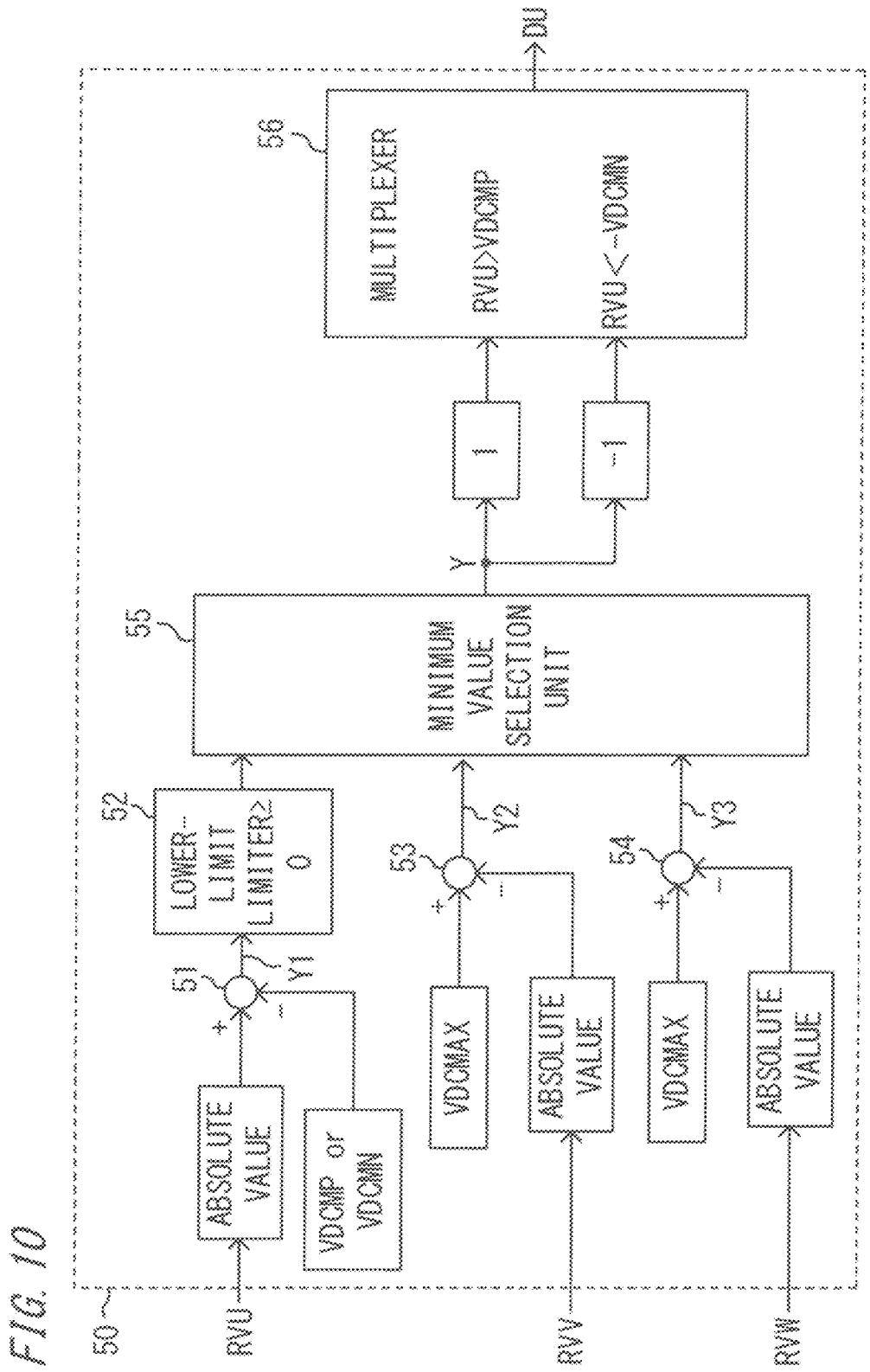
FIG. 10 is a function block diagram of a phase compensation voltage calculation unit in embodiment 3, at the time of a failure in one phase (U phase).

FIG. 10 is a block diagram of a phase compensation voltage calculation unit which calculates the above difference voltage Y and determines an adjustment voltage DU for the U phase. A phase compensation voltage calculation unit 50 is implemented by, for example, inputting a preset program via the volatile storage device to the processor included in the control device 10.

A subtractor 51 first obtains, as a first candidate Y1 for the above difference voltage Y, a difference voltage by subtracting the half busbar voltage VDCMP Or VDCMN from an absolute value |RVU| of the output voltage target value for the U phase. This difference voltage is defined as a first adjustment voltage. The first adjustment voltage is expressed with, for example, the following (expression 7). Further, the difference voltage Y1 has a lower Limit Limited by a lower-limit limiter 52, thereby having a minimum value of 0.

$$Y1=|RVU|-VDCMP \quad \text{(expression 7)}$$

In addition, in consideration of a likelihood regarding voltages for operations as the remaining gradationally controlled inverters, a second candidate Y2 and a third candidate Y3 are obtained as candidates for the above difference voltage Y according to the following (expression 8) and the following (expression 9), respectively.

$$Y2=VDCMAX-|RVV| \quad \text{(expression 8)}$$

$$Y3=VDCMAX-|RVW| \quad \text{(expression 9)}$$

It is noted that each of the above "VDCMAX"s is a value resulting from adding up the half busbar voltage VDCMP or VDCMN of the main inverter unit 2 and a value resulting from multiplying the busbar voltage VDCS of the corresponding sub-inverter by a usage rate determined by a designer. A three-level inverter operated according to pulse width control (PWM) has a usage rate equal to or higher than about 70%.

Specifically, in the phase compensation voltage calculation unit 50, a subtractor 53 obtains a difference voltage Y2 by subtracting the absolute value |RVV| of the output voltage target value for the V phase from the above VDCMAX according to the above (expression 8). This difference voltage Y2 is defined as a second adjustment voltage Y2. In addition, a subtractor 54 obtains a difference voltage Y3 by subtracting the absolute value |RVW| of the output voltage target value for the W phase from the above VDCMAX according to the above (expression 9). This difference voltage Y3 is defined as a third adjustment voltage Y3.

Next, a minimum value selection unit 55 selects, as an adjustment voltage Y, the smallest value (that is, an adjustment voltage with a smallest margin in compensation of the zero-phase voltage) from among the first to third adjustment voltages Y1, Y2, and Y3 obtained according to the above (expression 7), (expression 8), and (expression 9).

Then, the above adjustment voltage Y is made into an adjustment voltage marked with a positive sign and an adjustment voltage marked with a negative sign. Next, if the output voltage target value RVU for the U phase is equal to or larger than the half busbar voltage VDCMP, a multiplexer 56 outputs the positive adjustment voltage Y as the adjustment voltage DU for the U phase. Meanwhile, if the output voltage target value RVU for the U phase is equal to or smaller than the half busbar voltage VDCMN, the multiplexer 56 outputs the negative adjustment voltage −Y as the adjustment voltage DU for the U phase.

In the subsequent process, as shown in FIG. 6, the zero phase compensation voltage calculation unit 30 adds up the results of calculation of the adjustment voltages DX for the respective phases, to obtain a zero-phase compensation voltage DZERO with respect to the power conversion device. Subsequently, as shown in FIG. 7, the final output voltage target value calculation unit 40 adds, in a phase period during which the U phase lacks voltage by the busbar voltage VDCS, the zero-phase compensation voltage DZERO to each of the output voltage target values RVX for the three phases so that final output voltage target values RRVX for the respective phases are outputted. Consequently, unbalance in voltage among the phases is reduced as much as possible.

Figure 11:
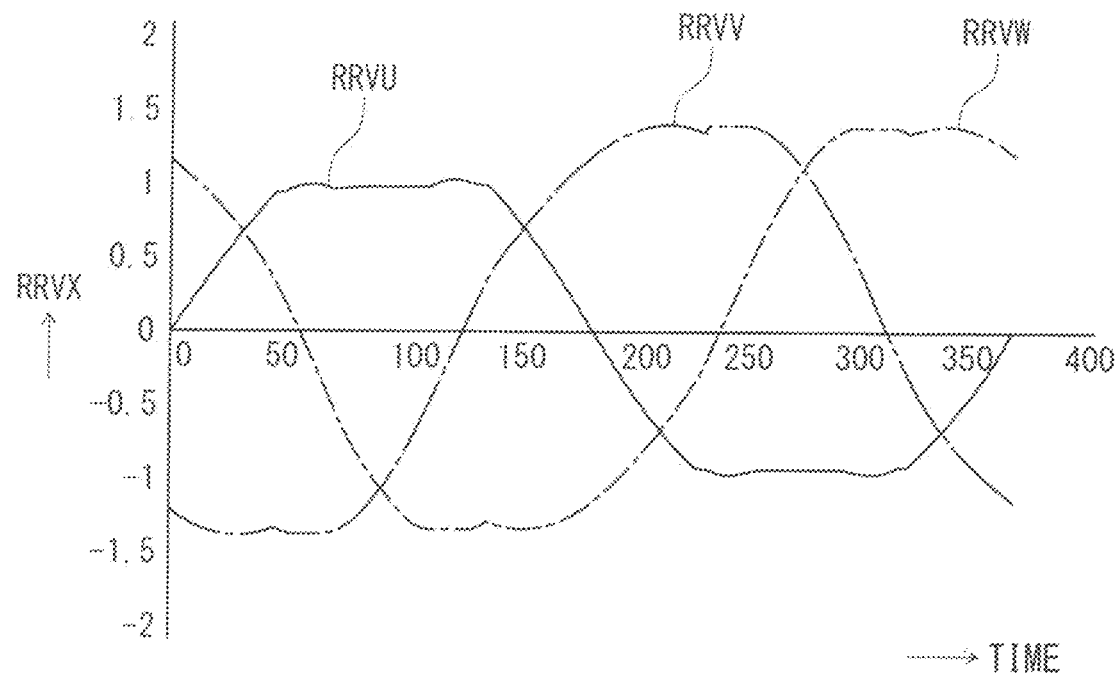
FIG. 11 is a waveform diagram showing final output voltage target values for the respective phases with respect to a power conversion device according to embodiment 3, the final output voltage target values resulting from zero-phase voltage compensation.

FIG. 11 is a waveform diagram showing the final output voltage target values RRVX for the respective phases with respect to the power conversion device, the final output voltage target values RRVX resulting from compensating the output voltage target values RVX by means of the zero-phase compensation voltage DZERO. It is noted that FIG. 11 shows a case where a condition is set such that the maximum instantaneous voltage is about 1.414 [p.u.] and the half busbar voltage VDCMP or VDCMN is 1.0 [p.u.].

In FIG. 11, the U-phase sub-inverter 5u has failed, the final output voltage target value RRVU for the U phase can be limited to about 1.0 [p.u.], and the final output voltage target values RRVV and RRVW for the V phase and the W phase in which no failures have occurred can be limited to about 1.414 [p.u.].

It is noted that, although descriptions have been given regarding the configuration shown in FIG. 10 on the premise that the failure phase is the U phase, the failure phase is not limited to the U phase, and the present disclosure is applicable also to the case where the failure phase is another phase or two failure phases are present.

Figure 12:
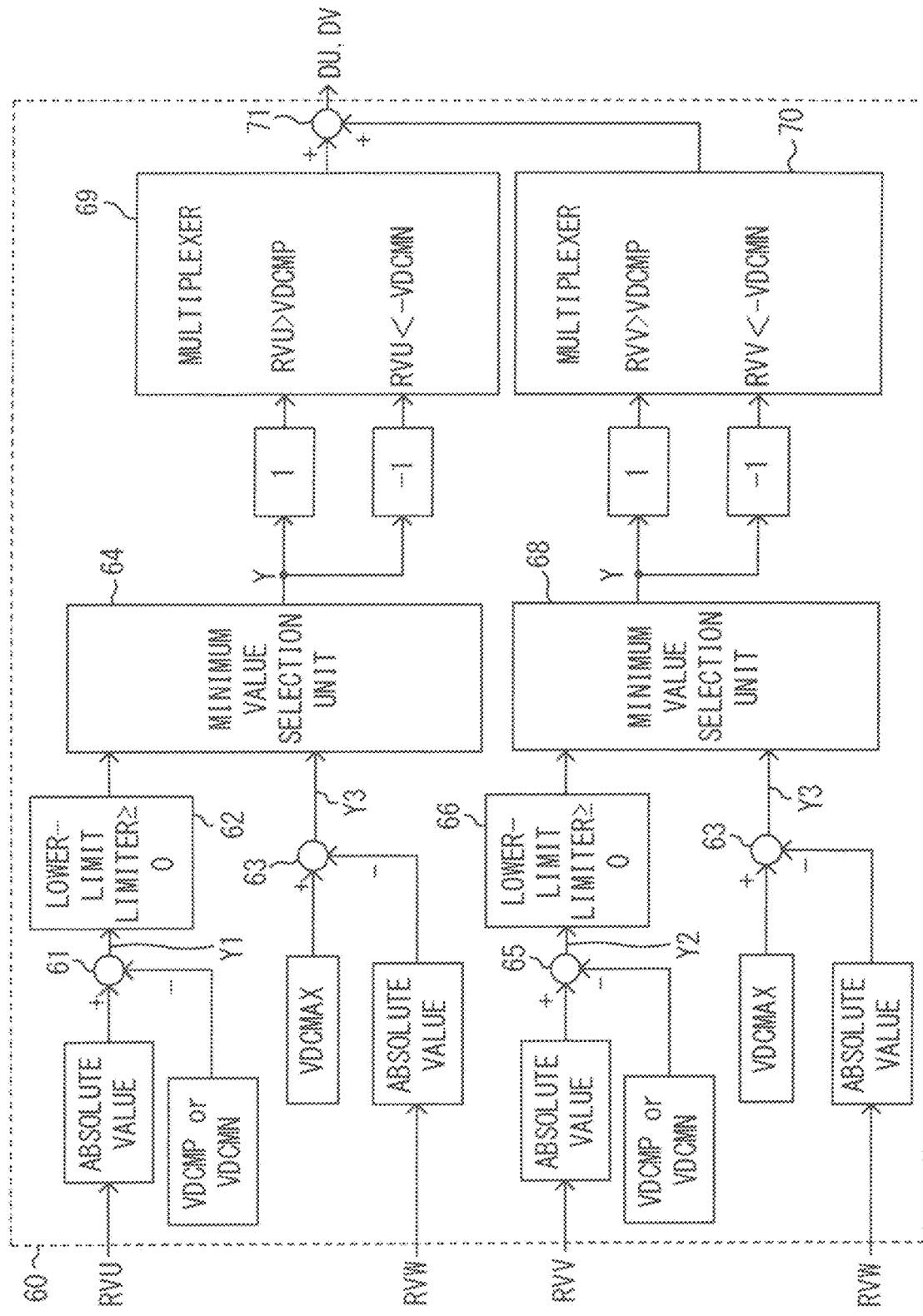
FIG. 12 is a function block diagram of a phase compensation voltage calculation unit in embodiment 3, at the time of failures in two phases (U phase and V phase).

FIG. 12 is a function block diagram of a phase compensation voltage calculation unit in the case where, for example, failure phases are the U phase and the V phase.

In a phase compensation voltage calculation unit 60, a subtractor 61 obtains a difference voltage for the U phase as a failure phase according to the aforementioned (expression 7). This difference voltage is defined as a first adjustment voltage Y1. It is noted that the first adjustment voltage Y1 has a lower limit limited by a lower-limit limiter 62, thereby having a minimum value of 0. Likewise, a subtractor 65 obtains a difference voltage also for the V phase as a failure phase according to the aforementioned (expression 7). This difference voltage is defined as a second adjustment voltage Y2. It is noted that the second adjustment voltage 22 has a lower limit limited by a lower-limit Limiter 66, thereby having a minimum value of 0. Meanwhile, each of subtractors 63 obtains a difference voltage for the W phase as a normal phase according to the aforementioned (expression 9). This difference voltage is defined as a third adjustment voltage Y3.

Then, minimum value selection units 64 and 68 respectively compare the first adjustment voltage Y1 and the second adjustment voltage Y2 with the third adjustment voltage Y3 and each select, as the above adjustment voltage Y, the smallest value (that is, an adjustment voltage with a smallest margin in compensation of the zero phase voltage) from among the first to third adjustment voltages Y1, Y2, and U3.

Next, if the output voltage target values RVU and RUV for the U phase and the V phase are equal to or larger than the half busbar voltage VDCMP, multiplexers 69 and 70 output positive adjustment voltages Y. Meanwhile, if the output voltage target values RVU and RVV for the U phase and the V phase are equal to or smaller than the half busbar voltage VDCMP, the multiplexers 69 and 70 output negative adjustment voltages −Y. Then, a value resulting from adding up the outputs from the multiplexers 69 and 70 by an adder 71 is finally outputted as adjustment voltages DU and DV for the failure phases. The subsequent process is the same as that in the case of FIG. 10.

As described above, in the present embodiment 3, even if there are main inverter arms being operated as three-level inverters owing to failures, a line-to-line voltage equivalent to that in gradational control can be outputted in a state of inhibiting overmodulation for all the phases, with an upper limit being the maximum value VDCMAX of a voltage capable of being outputted in a normal phase.

Embodiment 4

The entire configuration of a power conversion device according to the present embodiment 4 is the same as that in FIG. 1, and thus detailed descriptions thereof will be omitted here.

In the present embodiment 4, unbalance in voltage that occurs upon a failure of any of the sub-inverters is compensated for by means of a zero-phase voltage through a method different from those in embodiment 2 and embodiment 3. Specifically, in the present embodiment 4, a maximum value (peak value) VDCPEAK of an output voltage target value RVX for a failure phase is set as an upper limit. It is noted that a case where the failure phase is the U phase will be described here as an example.

The U-phase main inverter arm 3*u* corresponding to the failure phase is operated as a three-level inverter, and, if the maximum value (peak value) VDCPEAK of the output voltage target value RVU for the U phase as a failure phase is equal to or larger than the half busbar voltage VDCMP of the main inverter unit 2 or is equal to or smaller than the half busbar voltage VDCMN of the main inverter unit 2, a difference voltage Y therebetween is, as an adjustment voltage for zero phase compensation, added to or subtracted from each of the output voltage target values RVU, RVV, and RVW for the U phase, the V phase, and the W phase.

Figure 13:
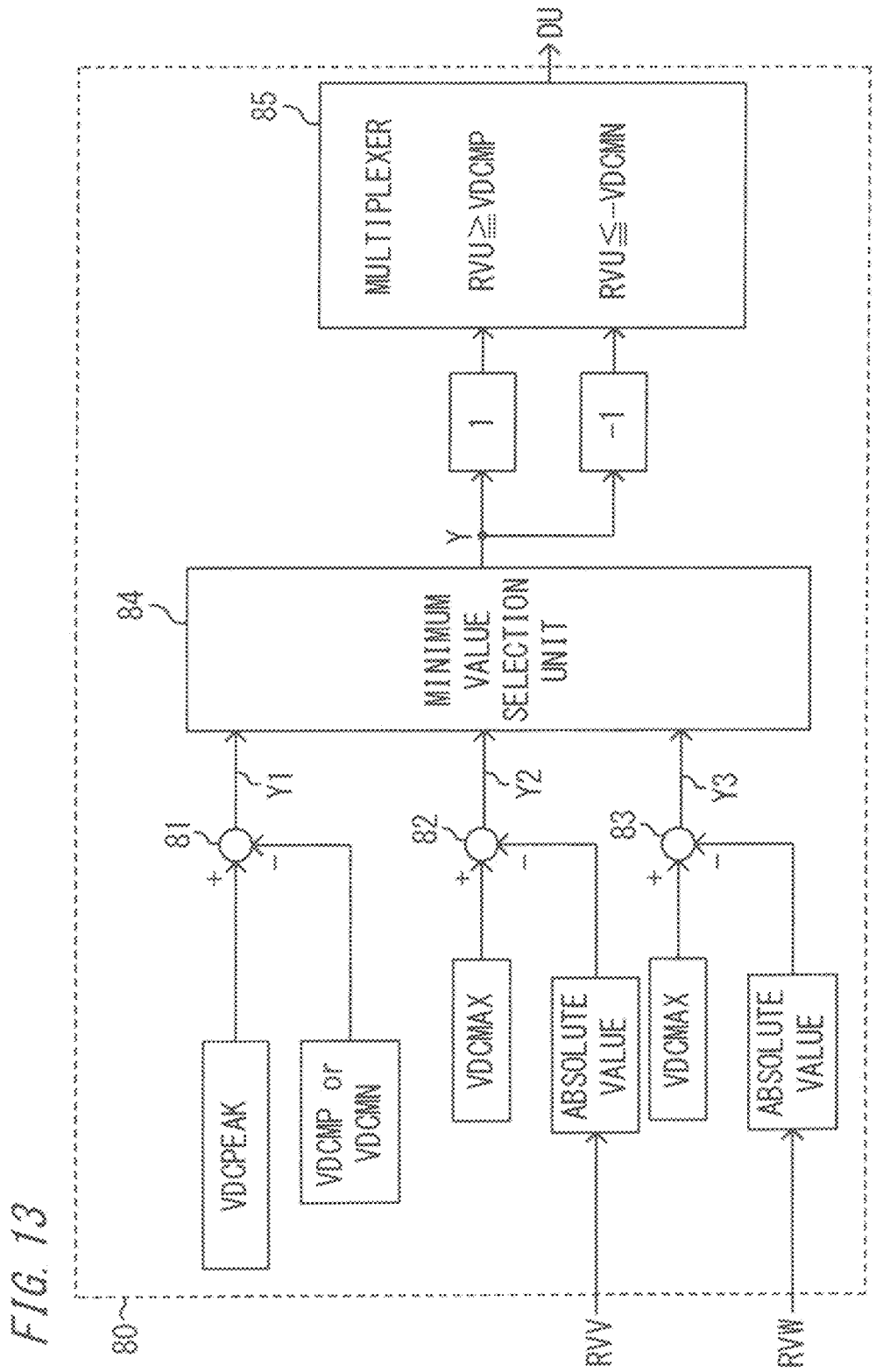
FIG. 13 is a function block diagram of a phase compensation voltage calculation unit in embodiment 4, at the time of a failure in one phase (U phase).

FIG. 13 is a block diagram of a phase compensation voltage calculation unit which calculates the above difference voltage Y and determines an adjustment voltage DX for the U phase. A phase compensation voltage calculation unit 80 is implemented by, for example, inputting a preset program via the volatile storage device to the processor included in the control device 10.

A subtractor 81 first obtains, as a first candidate Y1 for the value of the above difference voltage Y, a difference voltage by subtracting the half busbar voltage VDCMP or VDCMN from the maximum value VDCPEAK of the output voltage target value RVU for the U phase. This difference voltage is defined as a first adjustment voltage Y1. The first adjustment voltage is expressed with, for example, the following (expression 10). It is noted that, in the case where AC voltage is predetermined, the first adjustment voltage Y1 may be treated as a fixed value at a corresponding voltage cycle.

$$Y1=VDCPEAK-VDCMP \qquad \text{(expression 10)}$$

In addition, in consideration of a likelihood regarding voltages for operations as the remaining gradationally controlled inverters, a subtractor 82 obtains a difference voltage as a candidate for the above difference voltage Y by subtracting the absolute value |RVV| of the output voltage target value for the V phase from VDCMAX according to the aforementioned (expression 8). This difference voltage is defined as a second adjustment voltage Y2. In addition, a subtractor 83 obtains a difference voltage by subtracting the absolute value |RVW| of the output voltage target value for the W phase from VDCMAX according to the aforementioned (expression 9). This difference voltage is defined as a third adjustment voltage Y3.

Next, a minimum value selection unit 84 selects, as an adjustment voltage Y, the smallest value (that is, an adjustment voltage with a smallest margin in compensation of the zero-phase voltage) from among the first to third adjustment voltages Y1, Y2, and Y3 obtained according to the above (expression 10), (expression 8), and (expression 9).)

Then, the above adjustment voltage Y is made into an adjustment voltage marked with a positive sign and an adjustment voltage marked with a negative sign. Next, if the output voltage target value RVU for the U phase is equal to or larger than the half busbar voltage VDCMP, a multiplexer 85 outputs the positive adjustment voltage Y as the adjustment voltage DU for the U phase. Meanwhile, if the output voltage target value RVU for the U phase is equal to or smaller than the half busbar voltage VDCMP, the multiplexer 85 outputs the negative adjustment voltage −Y as the adjustment voltage DU for the U phase.

In the subsequent process, as shown in FIG. 6, the zero-phase compensation voltage calculation unit 30 adds up the results of calculation of the adjustment voltages DX for the respective phases, to obtain a zero-phase compensation voltage DZERO with respect to the power conversion device. Subsequently, as shown in FIG. 7, the final output voltage target value calculation unit 40 adds, in a phase period during which the U phase lacks voltage by the busbar voltage VDCS, the zero-phase compensation voltage DZERO to each of the output voltage target values RVX for the three phases so that final output voltage target values RRVX for the respective phases are outputted. Consequently, unbalance in voltage among the phases is reduced as much as possible.

Figure 14:
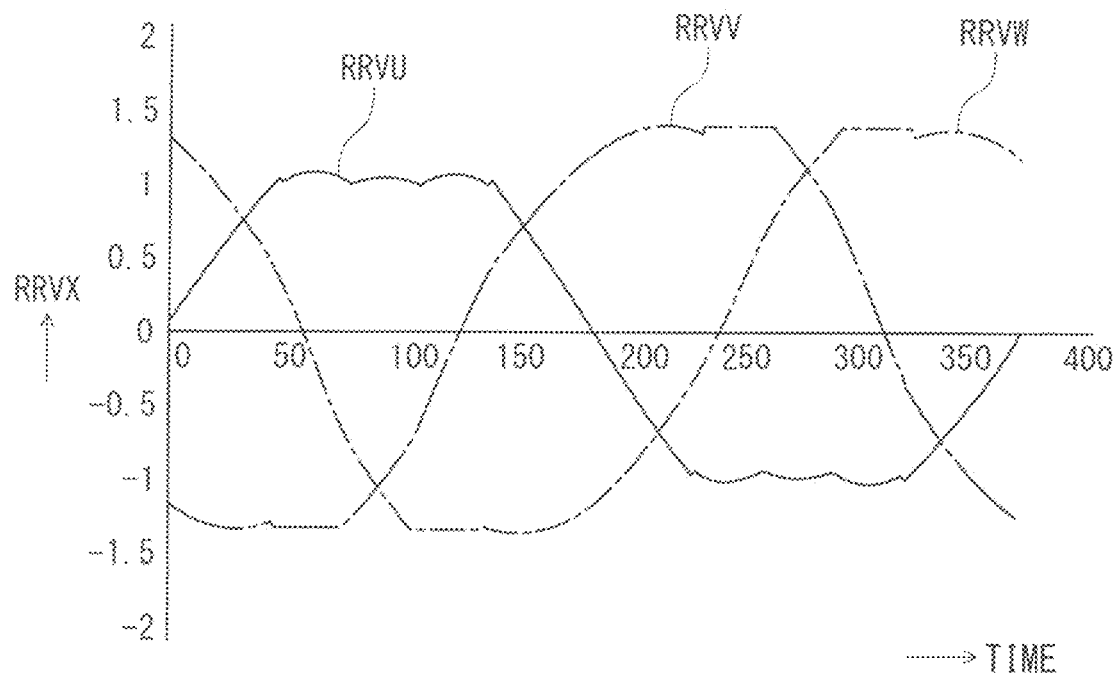
FIG. 14 is a waveform diagram showing final output voltage target values for the respective phases with respect to a power conversion device according to embodiment 4, the final output voltage target values resulting from zero-phase voltage compensation.

FIG. 14 is a waveform diagram showing the final output voltage target values RRVX for the respective phases with respect to the power conversion device, the final output voltage target values RRVX resulting from compensating the output voltage target values RVX by means of the zero-phase compensation voltage DZERO. It is noted that this drawing shows a case where a condition is set such that the maximum instantaneous voltage is about 1.414 [p.u.] and the half busbar voltage VDCMP or VDCMN is 1.0 [p.u.].

It is noted that, although descriptions have been given regarding the configuration shown in FIG. 13 on the premise that the failure phase is the U phase, the failure phase is not limited to the U phase, and the present disclosure is applicable also to the case where the failure phase is another phase or two failure phases are present.

Figure 15:
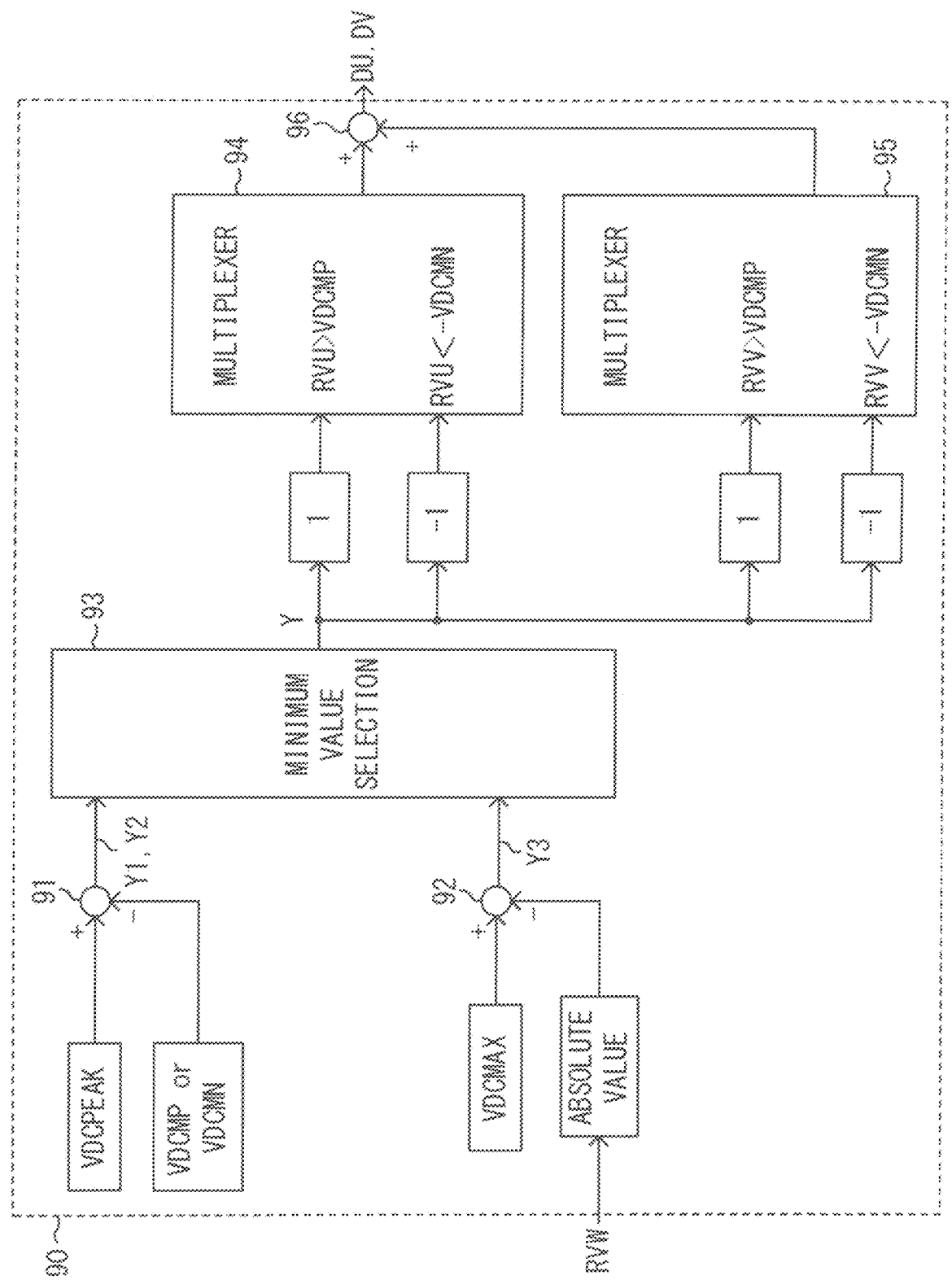
FIG. 15 is a function block diagram of a phase compensation voltage calculation unit in embodiment 4, at the time of failures in two phases (U phase and V phase).

FIG. 15 shows function blocks of a phase compensation voltage calculation unit in the case where, for example, the failure phases are the U phase and the V phase.

In a phase compensation voltage calculation unit 90, a subtractor 91 obtains difference voltages Y1 and Y2 for the U phase and the V phase as failure phases according to the aforementioned (expression 10). These difference voltages Y1 and Y2 are defined as a first adjustment voltage Y1 and a second adjustment voltage Y2. Meanwhile, a subtractor 92 obtains a difference voltage Y3 for the W phase as a normal phase according to the aforementioned (expression 9). This difference voltage Y3 is defined as a third adjustment voltage Y3.

Then, a minimum value selection unit 93 selects, as the above adjustment voltage Y, the smallest value (that is, an adjustment voltage with a smallest margin in compensation of the zero-phase voltage) from among the first to third adjustment voltages Y1, Y2, and Y3 obtained according to the above (expression 10) and (expression 9).

Next, if the output voltage target values RVU and RUV for the U phase and the V phase are equal to or larger than the half busbar voltage VDCMP, multiplexers 94 and 95 output positive adjustment voltages Y. Meanwhile, if the output voltage target values RVU and RVV for the U phase and the V phase are equal to or smaller than the half busbar voltage VDCMP, the multiplexers 94 and 95 output negative adjustment voltages −Y. Then, a value resulting from adding up the outputs from the multiplexers 94 and 95 by an adder 96 is finally outputted as adjustment voltages DU and DV for the failure phases. The subsequent process is the same as that in the case of FIG. 10.

As described above, in the present embodiment 4, even if there are inverter arms being operated as three-level inverters owing to failures, a line-to-line voltage equivalent to that in gradational control can be outputted in a state of inhibiting overmodulation for all the phases. Thus, the magnitude of output with respect to the load can be maintained. In addition, the calculation amount for a compensation voltage necessary for a failure phase can be reduced.

Figure 16:
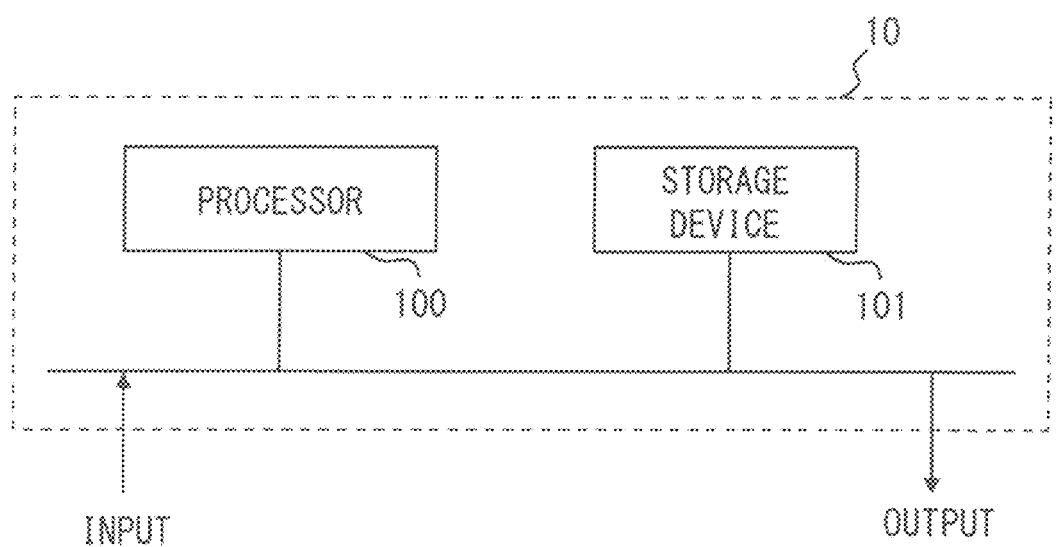
FIG. 16 is a function block diagram showing an example of hardware of a control device in each embodiment.

It is noted that, in the above embodiments, the control device 10 is composed of a processor 100 and a storage device 101, an example of hardware of the control device 10 being shown in FIG. 16. Although not shown, the storage device includes a volatile storage device such as a random access memory and a nonvolatile auxiliary storage device such as a flash memory.

Alternatively, the storage device may include, as the auxiliary storage device, a hard disk instead of a flash memory. The processor 100 executes a program inputted from the storage device 101. In this case, the program is inputted from the auxiliary storage device via the volatile storage device to the processor 100. Further, the processor 100 may output data such as a computation result to the volatile storage device of the storage device 101 or may save the data via the volatile storage device into the auxiliary storage device.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, the cases where at least one of the constituent components is modified, added, or eliminated (and furthermore, the cases where at least one of the constituent components mentioned in at least one of the preferred embodiments is selected and combined with the constituent components mentioned in another preferred embodiment), are included.

DESCRIPTION OF THE REFERENCE CHARACTERS

1 DC source
2 main inverter unit
3x, 3u, 3v, and 3w main inverter arms for respective phases
4 sub-inverter unit
5x, 5u, 5v, 5w sub-inverters for respective phases
6x, 6u, 6v, 6w short-circuit switches for respective phases
9 load
10 control device
20, 50, 60, 80, 90 phase compensation voltage calculation unit
30 zero-phase compensation voltage calculation unit
40 final output voltage target value calculation unit

The invention claimed is:

1. A power conversion device comprising:
a main inverter circuitry which has three main inverter arms for outputting respective voltages for a U phase, a V phase, and a W phase, and to which a voltage of a DC source is applied through a DC busbar;
a sub-inverter circuitry having three single-phase sub-inverters, the sub-inverters being individually connected in series to outputs of the respective main inverter arms, each sub-inverter being individually provided with a short-circuit switch which causes short-circuiting between an input terminal and an output terminal of the sub-inverter; and
control circuitry which controls the main inverter circuitry, the sub-inverter circuitry, and the short-circuit switch, wherein
through control by the control circuitry,
in a normal state where none of the sub-inverters has failed, operations as gradationally controlled inverters are performed, each gradationally controlled inverter being configured to output a voltage resulting from adding up an output voltage from the main inverter arm for the corresponding phase and an output voltage from the sub-inverter for the phase, and meanwhile,
in a state where any of the sub-inverters has failed,
the short-circuit switch for the phase corresponding to the sub-inverter having failed is closed,
the corresponding main inverter arm is operated as a three-level inverter, and,
for the phases corresponding to the sub-inverters not having failed, operations as gradationally controlled inverters are performed in a same manner as in the normal state, each gradationally controlled inverter being configured to output a voltage resulting from adding up an output voltage from the main inverter arm for the corresponding phase and an output voltage from the sub-inverter for the phase.

2. The power conversion device according to claim 1, wherein
a switching frequency of the main inverter arm operated as the three-level inverter is higher than a switching frequency of each of the main inverter arms operated as the gradationally controlled inverters.

3. The power conversion device according to claim 2, wherein
a DC busbar voltage applied to the main inverter circuitry is higher than a busbar voltage applied to each sub-inverter.

4. The power conversion device according to claim 2, wherein
for the main inverter arm operated as the three-level inverter owing to the failure of the sub-inverter, in a phase period during which a voltage of the DC busbar is lower than a corresponding output voltage target value, a zero-phase compensation voltage is added to each of target output voltages for the three phases.

5. The power conversion device according to claim 2, wherein
the control circuitry includes phase compensation voltage calculation circuitry for the three phases, a zero-phase compensation voltage calculation circuitry, and a final output voltage target value calculation circuitry,
each phase compensation voltage calculation circuitry
extracts, if an absolute value of a corresponding output voltage target value which is an output target with respect to a load exceeds a half busbar voltage which is a value half a busbar voltage of the DC source applied to the main inverter circuitry, a difference between the output voltage target value and the half busbar voltage,
imparts a negative polarity to the difference if the output voltage target value has a positive polarity,
imparts a positive polarity to the difference if the output voltage target value has a negative polarity, outputs the difference to which the polarity has been imparted, for the corresponding phase when the operation as the three-level inverter is being performed in the phase, and outputs zero for the phase when the operation as any of the gradationally controlled inverters is being performed in the phase, the zero-phase compensation voltage calculation circuitry outputs, as a zero-phase compensation voltage, a value resulting from adding up output results obtained for the respective phases by the respective phase compensation voltage calculation circuitry, and the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

6. The power conversion device according to claim 2, wherein the control circuitry includes phase compensation voltage calculation circuitry for the three phases, a zero-phase compensation voltage calculation circuitry, and a final output voltage target value calculation circuitry, each phase compensation voltage calculation circuitry outputs, if an absolute value of a corresponding output voltage target value which is an output target with respect to a load exceeds a half busbar voltage which is a value half a DC busbar voltage applied to the main inverter circuitry, an adjustment voltage for the output voltage target value, the adjustment voltage being a smallest value selected from among a first adjustment voltage, a second adjustment voltage, and a third adjustment voltage, the first adjustment voltage having been extracted as a difference between the half busbar voltage and an absolute value of the output voltage target value for the phase corresponding to the operation as the three-level inverter, the second adjustment voltage having been extracted as a difference between an absolute value of the output voltage target value for either of the phases corresponding to the operations as the gradationally controlled inverters, and a sum of the half busbar voltage and a value resulting from multiplying the DC busbar voltage by a maximum usage rate, the third adjustment voltage having been extracted as a difference between an absolute value of the output voltage target value for another one of the phases corresponding to the operations as the gradationally controlled inverters, and a sum of the half busbar voltage and a value resulting from multiplying the DC busbar voltage by a maximum usage rate, imparts a negative polarity to the extracted adjustment voltage and outputs the resultant adjustment voltage if the output voltage target value for the phase corresponding to the operation as the three-level inverter has a positive polarity and an absolute value of the output voltage target value exceeds the half busbar voltage, and imparts a positive polarity to the extracted adjustment voltage and outputs the resultant adjustment voltage if the output voltage target value has a negative polarity and the absolute value of the output voltage target value exceeds the half busbar voltage, the zero-phase compensation voltage calculation circuitry outputs, as a zero-phase compensation voltage, a value resulting from adding up output results obtained for the respective phases by the respective phase compensation voltage calculation circuitry, and the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

7. The power conversion device according to claim 2, wherein the control circuitry includes phase compensation voltage calculation circuitry for the three phases, a zero-phase compensation voltage calculation circuitry, and a final output voltage target value calculation circuitry, each phase compensation voltage calculation circuitry outputs, if an absolute value of a corresponding output voltage target value which is an output target with respect to a load exceeds a half busbar voltage which is a value half a DC busbar voltage applied to the main inverter circuitry, an adjustment voltage for the output voltage target value, the adjustment voltage being a smallest value selected from among a first adjustment voltage, a second adjustment voltage, and a third adjustment voltage, the first adjustment voltage having been extracted as a difference between the half busbar voltage and a peak value of the output voltage target value for the phase corresponding to the operation as the three-level inverter, the second adjustment voltage having been extracted as a difference between an absolute value of the output voltage target value for either of the phases corresponding to the operations as the gradationally controlled inverters, and a sum of the half busbar voltage and a value resulting from multiplying the DC busbar voltage by a maximum usage rate, the third adjustment voltage having been extracted as a difference between an absolute value of the output voltage target value for another one of the phases corresponding to the operations as the gradationally controlled inverters, and a sum of the half busbar voltage and a value resulting from multiplying the DC busbar voltage by a maximum usage rate, imparts a negative polarity to the extracted adjustment voltage and outputs the resultant adjustment voltage if the output voltage target value for the phase corresponding to the operation as the three-level inverter has a positive polarity and an absolute value of the output voltage target value exceeds the half busbar voltage, and imparts a positive polarity to the extracted adjustment voltage and outputs the resultant adjustment voltage if the output voltage target value has a negative polarity and the absolute value of the output voltage target value exceeds the half busbar voltage, the zero-phase compensation voltage calculation circuitry outputs, as a zero-phase compensation voltage, a value resulting from adding up output results obtained for the respective phases by the respective phase compensation voltage calculation circuitry, and the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

8. The power conversion device according to claim 2, wherein the control circuitry includes phase compensation voltage calculation circuitry for the three phases, a zero-phase compensation voltage calculation circuitry, and a final output voltage target value calculation circuitry, each phase compensation voltage calculation circuitry outputs, if an absolute value of a corresponding output voltage target value which is an output target with respect to a load exceeds a half busbar voltage which is a value half a DC busbar voltage applied to the main inverter circuitry, an adjustment voltage for the output voltage target value, the adjustment voltage being a smallest value selected from among a first adjustment voltage, a second adjustment voltage, and a third adjustment voltage, the first adjustment voltage having been extracted as a difference between the half busbar voltage and an absolute value of the output voltage target value for either of the phases corresponding to the operations as the three-level inverters, the second adjustment voltage having been extracted as a difference between the half busbar voltage and an absolute value of the output voltage target value for another one of the phases corresponding to the operations as the three-level inverters, the third adjustment voltage having been extracted as a difference between an absolute value of the output voltage target value for the phase corresponding to the operation as the gradationally controlled inverter, and a sum of the half busbar voltage and a value resulting from multiplying the DC busbar voltage by a maximum usage rate, imparts a negative polarity to the extracted adjustment voltage and outputs the resultant adjustment voltage if the output voltage target value for each of the phases corresponding to the operations as the three-level inverters has a positive polarity and an absolute value of the output voltage target value exceeds the half busbar voltage, and imparts a positive polarity to the extracted adjustment voltage and outputs the resultant adjustment voltage if the output voltage target value has a negative polarity and the absolute value of the output voltage target value exceeds the half busbar voltage, both of the resultant adjustment voltages being added up, the zero-phase compensation voltage calculation circuitry outputs, as a zero-phase compensation voltage, a value resulting from adding up output results obtained for the respective phases by the respective phase compensation voltage calculation circuitry, and the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

9. The power conversion device according to claim 2, wherein the control circuitry includes phase compensation voltage calculation circuitry for the three phases, a zero-phase compensation voltage calculation circuitry, and a final output voltage target value calculation circuitry, each phase compensation voltage calculation circuitry outputs, if an absolute value of a corresponding output voltage target value which is an output target with respect to a load exceeds a half busbar voltage which is a value half a DC busbar voltage applied to the main inverter circuitry, an adjustment voltage for the output voltage target value, the adjustment voltage being a smallest value selected from among a first adjustment voltage, a second adjustment voltage, and a third adjustment voltage, the first adjustment voltage having been extracted as a difference between the half busbar voltage and a peak value of the output voltage target value for either of the phases corresponding to the operations as the three-level inverters, the second adjustment voltage having been extracted as a difference between the half busbar voltage and a peak value of the output voltage target value for another one of the phases corresponding to the operations as the three-level inverters, the third adjustment voltage having been extracted as a difference between an absolute value of the output voltage target value for the phase corresponding to the operation as the gradationally controlled inverter, and a sum of the half busbar voltage and a value resulting from multiplying the DC busbar voltage by a maximum usage rate, imparts a negative polarity to the extracted adjustment voltage and outputs the resultant adjustment voltage if the output voltage target value for each of the phases corresponding to the operations as the three-level inverters has a positive polarity and an absolute value of the output voltage target value exceeds the half busbar voltage, and imparts a positive polarity to the extracted adjustment voltage and outputs the resultant adjustment voltage if the output voltage target value has a negative polarity and the absolute value of the output voltage target value exceeds the half busbar voltage, both of the resultant adjustment voltages being added up, the zero-phase compensation voltage calculation circuitry outputs, as a zero-phase compensation voltage, a value resulting from adding up output results obtained for the respective phases by the respective phase compensation voltage calculation circuitry, and the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

10. The power conversion device according to claim 1, wherein a DC busbar voltage applied to the main inverter circuitry is higher than a busbar voltage applied to each sub-inverter.

11. The power conversion device according to claim 10, wherein for the main inverter arm operated as the three-level inverter owing to the failure of the sub-inverter, in a phase period during which a voltage of the DC busbar is lower than a corresponding output voltage target value, a zero-phase compensation voltage is added to each of target output voltages for the three phases.

12. The power conversion device according to claim 10, wherein the control circuitry includes phase compensation voltage calculation circuitry for the three phases, a zero-phase compensation voltage calculation circuitry, and a final output voltage target value calculation circuitry, each phase compensation voltage calculation circuitry
extracts, if an absolute value of a corresponding output voltage target value which is an output target with respect to a load exceeds a half busbar voltage which is a value half a busbar voltage of the DC source applied to the main inverter circuitry, a difference between the output voltage target value and the half busbar voltage, imparts a negative polarity to the difference if the output voltage target value has a positive polarity, imparts a positive polarity to the difference if the output voltage target value has a negative polarity, outputs the difference to which the polarity has been imparted, for the corresponding phase when the operation as the three-level inverter is being performed in the phase, and outputs zero for the phase when the operation as any of the gradationally controlled inverters is being performed in the phase, the zero-phase compensation voltage calculation circuitry outputs, as a zero-phase compensation voltage, a value resulting from adding up output results obtained for the respective phases by the respective phase compensation voltage calculation circuitry, and the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

13. The power conversion device according to claim 10, wherein the control circuitry includes phase compensation voltage calculation circuitry for the three phases, a zero-phase compensation voltage calculation circuitry, and a final output voltage target value calculation circuitry, each phase compensation voltage calculation circuitry
outputs, if an absolute value of a corresponding output voltage target value which is an output target with respect to a load exceeds a half busbar voltage which is a value half a DC busbar voltage applied to the main inverter circuitry, an adjustment voltage for the output voltage target value, the adjustment voltage being a smallest value selected from among a first adjustment voltage, a second adjustment voltage, and a third adjustment voltage, the first adjustment voltage having been extracted as a difference between the half busbar voltage and an absolute value of the output voltage target value for the phase corresponding to the operation as the three-level inverter, the second adjustment voltage having been extracted as a difference between an absolute value of the output voltage target value for either of the phases corresponding to the operations as the gradationally controlled inverters, and a sum of the half busbar voltage and a value resulting from multiplying the DC busbar voltage by a maximum usage rate, the third adjustment voltage having been extracted as a difference between an absolute value of the output voltage target value for another one of the phases corresponding to the operations as the gradationally controlled inverters, and a sum of the half busbar voltage and a value resulting from multiplying the DC busbar voltage by a maximum usage rate, imparts a negative polarity to the extracted adjustment voltage and outputs the resultant adjustment voltage if the output voltage target value for the phase corresponding to the operation as the three-level inverter has a positive polarity and an absolute value of the output voltage target value exceeds the half busbar voltage, and imparts a positive polarity to the extracted adjustment voltage and outputs the resultant adjustment voltage if the output voltage target value has a negative polarity and the absolute value of the output voltage target value exceeds the half busbar voltage, the zero-phase compensation voltage calculation circuitry outputs, as a zero-phase compensation voltage, a value resulting from adding up output results obtained for the respective phases by the respective phase compensation voltage calculation circuitry, and the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

14. The power conversion device according to claim 10, wherein the control circuitry includes phase compensation voltage calculation circuitry for the three phases, a zero-phase compensation voltage calculation circuitry, and a final output voltage target value calculation circuitry, each phase compensation voltage calculation circuitry
outputs, if an absolute value of a corresponding output voltage target value which is an output target with respect to a load exceeds a half busbar voltage which is a value half a DC busbar voltage applied to the main inverter circuitry, an adjustment voltage for the output voltage target value, the adjustment voltage being a smallest value selected from among a first adjustment voltage, a second adjustment voltage, and a third adjustment voltage, the first adjustment voltage having been extracted as a difference between the half busbar voltage and a peak value of the output voltage target value for the phase corresponding to the operation as the three-level inverter, the second adjustment voltage having been extracted as a difference between an absolute value of the output voltage target value for either of the phases corresponding to the operations as the gradationally controlled inverters, and a sum of the half busbar voltage and a value resulting from multiplying the DC busbar voltage by a maximum usage rate, the third adjustment voltage having been extracted as a difference between an absolute value of the output voltage target value for another one of the phases corresponding to the operations as the gradationally controlled inverters, and a sum of the half busbar voltage and a value resulting from multiplying the DC busbar voltage by a maximum usage rate, imparts a negative polarity to the extracted adjustment voltage and outputs the resultant adjustment voltage if the output voltage target value for the phase corresponding to the operation as the three-level inverter has a positive polarity and an absolute value of the output voltage target value exceeds the half busbar voltage, and imparts a positive polarity to the extracted adjustment voltage and outputs the resultant adjustment voltage if the output voltage target value has a negative polarity and the absolute value of the output voltage target value exceeds the half busbar voltage, the zero-phase compensation voltage calculation circuitry outputs, as a zero-phase compensation voltage, a value resulting from adding up output results obtained for the respective phases by the respective phase compensation voltage calculation circuitry, and the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

15. The power conversion device according to claim 1, wherein for the main inverter arm operated as the three-level inverter owing to the failure of the sub-inverter, in a phase period during which a voltage of the DC busbar is lower than a corresponding output voltage target value, a zero-phase compensation voltage is added to each of target output voltages for the three phases.

16. The power conversion device according to claim 1, wherein the control circuitry includes phase compensation voltage calculation circuitry for the three phases, a zero-phase compensation voltage calculation circuitry, and a final output voltage target value calculation circuitry, each phase compensation voltage calculation circuitry extracts, if an absolute value of a corresponding output voltage target value which is an output target with respect to a load exceeds a half busbar voltage which is a value half a busbar voltage of the DC source applied to the main inverter circuitry, a difference between the output voltage target value and the half busbar voltage, imparts a negative polarity to the difference if the output voltage target value has a positive polarity, imparts a positive polarity to the difference if the output voltage target value has a negative polarity, outputs the difference to which the polarity has been imparted, for the corresponding phase when the operation as the three-level inverter is being performed in the phase, and outputs zero for the phase when the operation as any of the gradationally controlled inverters is being performed in the phase, the zero-phase compensation voltage calculation circuitry outputs, as a zero-phase compensation voltage, a value resulting from adding up output results obtained for the respective phases by the respective phase compensation voltage calculation circuitry, and the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

17. The power conversion device according to claim 1, wherein the control circuitry includes phase compensation voltage calculation circuitry for the three phases, a zero-phase compensation voltage calculation circuitry, and a final output voltage target value calculation circuitry, each phase compensation voltage calculation circuitry outputs, if an absolute value of a corresponding output voltage target value which is an output target with respect to a load exceeds a half busbar voltage which is a value half a DC busbar voltage applied to the main inverter circuitry, an adjustment voltage for the output voltage target value, the adjustment voltage being a smallest value selected from among a first adjustment voltage, a second adjustment voltage, and a third adjustment voltage, the first adjustment voltage having been extracted as a difference between the half busbar voltage and an absolute value of the output voltage target value for the phase corresponding to the operation as the three-level inverter, the second adjustment voltage having been extracted as a difference between an absolute value of the output voltage target value for either of the phases corresponding to the operations as the gradationally controlled inverters, and a sum of the half busbar voltage and a value resulting from multiplying the DC busbar voltage by a maximum usage rate, the third adjustment voltage having been extracted as a difference between an absolute value of the output voltage target value for another one of the phases corresponding to the operations as the gradationally controlled inverters, and a sum of the half busbar voltage and a value resulting from multiplying the DC busbar voltage by a maximum usage rate, imparts a negative polarity to the extracted adjustment voltage and outputs the resultant adjustment voltage if the output voltage target value for the phase corresponding to the operation as the three-level inverter has a positive polarity and an absolute value of the output voltage target value exceeds the half busbar voltage, and imparts a positive polarity to the extracted adjustment voltage and outputs the resultant adjustment voltage if the output voltage target value has a negative polarity and the absolute value of the output voltage target value exceeds the half busbar voltage, the zero-phase compensation voltage calculation circuitry outputs, as a zero-phase compensation voltage, a value resulting from adding up output results obtained for the respective phases by the respective phase compensation voltage calculation circuitry, and the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

18. The power conversion device according to claim 1, wherein
the control circuitry includes phase compensation voltage calculation circuitry for the three phases, a zero-phase compensation voltage calculation circuitry, and a final output voltage target value calculation circuitry,
each phase compensation voltage calculation circuitry
outputs, if an absolute value of a corresponding output voltage target value which is an output target with respect to a load exceeds a half busbar voltage which is a value half a DC busbar voltage applied to the main inverter circuitry, an adjustment voltage for the output voltage target value,
the adjustment voltage being a smallest value selected from among a first adjustment voltage, a second adjustment voltage, and a third adjustment voltage,
the first adjustment voltage having been extracted as a difference between the half busbar voltage and a peak value of the output voltage target value for the phase corresponding to the operation as the three-level inverter,
the second adjustment voltage having been extracted as a difference between an absolute value of the output voltage target value for either of the phases corresponding to the operations as the gradationally controlled inverters, and a sum of the half busbar voltage and a value resulting from multiplying the DC busbar voltage by a maximum usage rate,
the third adjustment voltage having been extracted as a difference between an absolute value of the output voltage target value for another one of the phases corresponding to the operations as the gradationally controlled inverters, and a sum of the half busbar voltage and a value resulting from multiplying the DC busbar voltage by a maximum usage rate,
imparts a negative polarity to the extracted adjustment voltage and outputs the resultant adjustment voltage if the output voltage target value for the phase corresponding to the operation as the three-level inverter has a positive polarity and an absolute value of the output voltage target value exceeds the half busbar voltage, and
imparts a positive polarity to the extracted adjustment voltage and outputs the resultant adjustment voltage if the output voltage target value has a negative polarity and the absolute value of the output voltage target value exceeds the half busbar voltage,
the zero-phase compensation voltage calculation circuitry outputs, as a zero-phase compensation voltage, a value resulting from adding up output results obtained for the respective phases by the respective phase compensation voltage calculation circuitry, and
the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

19. The power conversion device according to claim 1, wherein
the control circuitry includes phase compensation voltage calculation circuitry for the three phases, a zero-phase compensation voltage calculation circuitry, and a final output voltage target value calculation circuitry,
each phase compensation voltage calculation circuitry
outputs, if an absolute value of a corresponding output voltage target value which is an output target with respect to a load exceeds a half busbar voltage which is a value half a DC busbar voltage applied to the main inverter circuitry, an adjustment voltage for the output voltage target value,
the adjustment voltage being a smallest value selected from among a first adjustment voltage, a second adjustment voltage, and a third adjustment voltage,
the first adjustment voltage having been extracted as a difference between the half busbar voltage and an absolute value of the output voltage target value for either of the phases corresponding to the operations as the three-level inverters,
the second adjustment voltage having been extracted as a difference between the half busbar voltage and an absolute value of the output voltage target value for another one of the phases corresponding to the operations as the three-level inverters,
the third adjustment voltage having been extracted as a difference between an absolute value of the output voltage target value for the phase corresponding to the operation as the gradationally controlled inverter, and a sum of the half busbar voltage and a value resulting from multiplying the DC busbar voltage by a maximum usage rate,
imparts a negative polarity to the extracted adjustment voltage and outputs the resultant adjustment voltage if the output voltage target value for each of the phases corresponding to the operations as the three-level inverters has a positive polarity and an absolute value of the output voltage target value exceeds the half busbar voltage, and
imparts a positive polarity to the extracted adjustment voltage and outputs the resultant adjustment voltage if the output voltage target value has a negative polarity and the absolute value of the output voltage target value exceeds the half busbar voltage,
both of the resultant adjustment voltages being added up,
the zero-phase compensation voltage calculation circuitry outputs, as a zero-phase compensation voltage, a value resulting from adding up output results obtained for the respective phases by the respective phase compensation voltage calculation circuitry, and
the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

20. The power conversion device according to claim 1, wherein
the control circuitry includes phase compensation voltage calculation circuitry for the three phases, a zero-phase compensation voltage calculation circuitry, and a final output voltage target value calculation circuitry,
each phase compensation voltage calculation circuitry
outputs, if an absolute value of a corresponding output voltage target value which is an output target with respect to a load exceeds a half busbar voltage which is a value half a DC busbar voltage applied to the main inverter circuitry, an adjustment voltage for the output voltage target value,
  the adjustment voltage being a smallest value selected from among a first adjustment voltage, a second adjustment voltage, and a third adjustment voltage,
  the first adjustment voltage having been extracted as a difference between the half busbar voltage and a peak value of the output voltage target value for either of the phases corresponding to the operations as the three-level inverters,
  the second adjustment voltage having been extracted as a difference between the half busbar voltage and a peak value of the output voltage target value for another one of the phases corresponding to the operations as the three-level inverters,
  the third adjustment voltage having been extracted as a difference between an absolute value of the output voltage target value for the phase corresponding to the operation as the gradationally controlled inverter, and a sum of the half busbar voltage and a value resulting from multiplying the DC busbar voltage by a maximum usage rate,
imparts a negative polarity to the extracted adjustment voltage and outputs the resultant adjustment voltage if the output voltage target value for each of the phases corresponding to the operations as the three-level inverters has a positive polarity and an absolute value of the output voltage target value exceeds the half busbar voltage, and
  imparts a positive polarity to the extracted adjustment voltage and outputs the resultant adjustment voltage if the output voltage target value has a negative polarity and the absolute value of the output voltage target value exceeds the half busbar voltage,
  both of the resultant adjustment voltages being added up,
the zero-phase compensation voltage calculation circuitry outputs, as a zero-phase compensation voltage, a value resulting from adding up output results obtained for the respective phases by the respective phase compensation voltage calculation circuitry, and
the final output voltage target value calculation circuitry outputs, as final output voltage target values, values each resulting from adding the zero-phase compensation voltage obtained by the zero-phase compensation voltage calculation circuitry to a corresponding one of the output voltage target values for the three phases.

* * * * *